(12) United States Patent
Geirhofer et al.

(10) Patent No.: US 10,848,226 B2
(45) Date of Patent: Nov. 24, 2020

(54) MULTI-HYPOTHESIS CHANNEL QUALITY INDICATOR FEEDBACK

(71) Applicant: QUALCOMM Incorporated, San Diego, CA (US)

(72) Inventors: Stefan Geirhofer, Brooklyn, NY (US); Peter Gaal, San Diego, CA (US); Tingfang Ji, San Diego, CA (US); Alan Barbieri, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 15/873,273

(22) Filed: Jan. 17, 2018

(65) Prior Publication Data

US 2018/0145738 A1 May 24, 2018

Related U.S. Application Data

(62) Division of application No. 13/710,803, filed on Dec. 11, 2012, now Pat. No. 9,917,629.

(60) Provisional application No. 61/594,790, filed on Feb. 3, 2012, provisional application No. 61/570,738, filed on Dec. 14, 2011.

(51) Int. Cl.
  *H04B 7/06* (2006.01)
  *H04W 72/12* (2009.01)

(52) U.S. Cl.
  CPC ...... *H04B 7/0632* (2013.01); *H04W 72/1231* (2013.01)

(58) Field of Classification Search
  None
  See application file for complete search history.

(56) References Cited

U.S. PATENT DOCUMENTS

| | | |
|---|---|---|
| 8,687,741 B1 | 4/2014 | Erell |
| 9,125,229 B2 | 9/2015 | Tesanovic et al. |
| 9,294,231 B2 * | 3/2016 | Malladi ................. H04L 1/0026 |
| 2002/0181632 A1 | 12/2002 | Kang et al. |
| 2007/0160156 A1 | 7/2007 | Melzer et al. |
| 2007/0254652 A1 | 11/2007 | Khan et al. |
| 2008/0043867 A1 | 2/2008 | Blanz et al. |

(Continued)

FOREIGN PATENT DOCUMENTS

| | | | |
|---|---|---|---|
| EP | 2168285 B1 * | 3/2015 | ............... H04L 1/00 |
| WO | 2010077051 A3 | 8/2010 | |

(Continued)

OTHER PUBLICATIONS

International Preliminary Report on Patentability—PCT/US2012/069097—ISA/EPO—dated Jun. 17, 2014.

(Continued)

*Primary Examiner* — Xavier S Wong
(74) *Attorney, Agent, or Firm* — Austin Rapp

(57) ABSTRACT

A method for providing multi-hypothesis channel quality indicator (MH-CQI) feedback is described. Hypotheses corresponding to rank indicator (RI) and precoding matrix indicator (PMI) assumptions associated with a dominant interferer are selected. Multi-hypothesis channel quality indicator (MH-CQI) values based on the selected hypotheses are generated. The multi-hypothesis channel quality indicator (MH-CQI) values are encoded. The multi-hypothesis channel quality indicator (MH-CQI) values are sent as feedback.

29 Claims, 12 Drawing Sheets

(56) References Cited

U.S. PATENT DOCUMENTS

| | | |
|---|---|---|
| 2008/0219370 A1 | 9/2008 | Onggosanusi et al. |
| 2009/0033524 A1 | 2/2009 | Tiirola et al. |
| 2009/0221289 A1* | 9/2009 | Xu .................. H04L 5/0091 |
| | | 455/435.1 |
| 2010/0150007 A1* | 6/2010 | Jung ................ H04L 1/0027 |
| | | 370/252 |
| 2010/0238824 A1 | 9/2010 | Farajidana et al. |
| 2010/0322176 A1 | 12/2010 | Chen et al. |
| 2011/0032839 A1 | 2/2011 | Chen et al. |
| 2011/0034192 A1 | 2/2011 | Lim et al. |
| 2011/0053633 A1 | 3/2011 | Han et al. |
| 2011/0141926 A1 | 6/2011 | Damnjanovic et al. |
| 2011/0142147 A1* | 6/2011 | Chen ............. H04L 25/03343 |
| | | 375/260 |
| 2011/0222629 A1 | 9/2011 | Lindh et al. |
| 2011/0243012 A1* | 10/2011 | Luo .................. H04L 5/0064 |
| | | 370/252 |
| 2011/0249763 A1 | 10/2011 | Tosato et al. |
| 2011/0268067 A1 | 11/2011 | Seo et al. |
| 2012/0014476 A1 | 1/2012 | Kuchi et al. |
| 2012/0087435 A1 | 4/2012 | Gomadam et al. |
| 2012/0189077 A1 | 7/2012 | Seo et al. |
| 2012/0257568 A1* | 10/2012 | Cai .................. H04L 1/1861 |
| | | 370/328 |
| 2012/0257664 A1 | 10/2012 | Yue et al. |
| 2013/0003583 A1* | 1/2013 | Landstrom ........... H04B 7/0452 |
| | | 370/252 |
| 2013/0083681 A1* | 4/2013 | Ebrahimi Tazeh Mahalleh ......... |
| | | H04L 5/0057 |
| | | 370/252 |
| 2013/0114427 A1* | 5/2013 | Maattanen ............. H04B 7/024 |
| | | 370/252 |
| 2013/0114428 A1* | 5/2013 | Koivisto ............. H04B 7/0615 |
| | | 370/252 |
| 2013/0155973 A1 | 6/2013 | Geirhofer et al. |
| 2014/0064234 A1* | 3/2014 | Tong ................. H04W 72/0413 |
| | | 370/329 |

FOREIGN PATENT DOCUMENTS

| | | |
|---|---|---|
| WO | 2011123747 A1 | 10/2011 |
| WO | 2011142598 A2 | 11/2011 |

OTHER PUBLICATIONS

International Search Report and Written Opinion—PCT/US2012/069097—ISA/EPO—dated May 7, 2013

Samsung:"Discussion on Dynamic Switching vs Semi-Static Switching for SU and MU-MIMO" R1-094577, 3GPP TSG RAN WG1 #59, Jeju, Korea, Nov. 9-13, 2009, 2 Pages.

* cited by examiner

MULTI-HYPOTHESIS CHANNEL QUALITY INDICATOR FEEDBACK

RELATED APPLICATIONS

This application is a divisional of U.S. patent application Ser. No. 13/710,803, filed Dec. 11, 2012, for "MULTI-HYPOTHESIS CHANNEL QUALITY INDICATOR FEEDBACK," which is related to and claims priority from (a) U.S. Provisional Patent Application Ser. No. 61/570,738, filed Dec. 14, 2011, for "MULTI-HYPOTHESIS CQI FEEDBACK FOR MU-MIMO AND COMP," and (b) U.S. Provisional Patent Application Ser. No. 61/594,790, filed Feb. 3, 2012, for "GENERALIZED SCHEDULING IN A MACRO-RRH DEPLOYMENT."

TECHNICAL FIELD

The present disclosure relates generally to wireless communication systems. More specifically, the present disclosure relates to systems and methods for multi-hypothesis channel quality indicator (CQI) feedback.

BACKGROUND

Wireless communication systems are widely deployed to provide various types of communication content such as voice, video, data, and so on. These systems may be multiple-access systems capable of supporting simultaneous communication of one or more wireless communication devices with one or more base stations.

A problem that must be dealt with in all communication systems is interference. There may be problems with decoding the signals received. In wireless communication, one way to deal with these problems is by utilizing channel state information (CSI) feedback. As part of channel state information (CSI) feedback a wireless communication device may send channel quality indicator (CQI) values to one or more base stations. The one or more base stations may use the channel quality indicator (CQI) values to schedule wireless transmissions.

However, challenges may arise in calculating channel quality indicator (CQI) values in multi-user multiple-input and multiple-output (MU-MIMO) and coordinated multipoint (CoMP) systems where a wireless communication device may not be aware of other wireless communication devices and/or base stations. Therefore, wireless communication systems may use multi-hypothesis channel quality indicator (MH-CQI) feedback to provide system-wide gains. Instead of a single channel quality indicator (CQI) value, multiple channel quality indicator (CQI) values may be fed back to the base station. These multiple channel quality indicator (CQI) values may be computed based on different hypotheses about interference. These multi-hypothesis channel quality indicator (MH-CQI) values may be used for improving the pairing of wireless communication devices in multi-user multiple-input and multiple-output (MU-MIMO) systems. These multi-hypothesis channel quality indicator (MH-CQI) values may also be used for scheduling coordination in the case of a coordinated multipoint (CoMP) system.

SUMMARY

A method for providing multi-hypothesis channel quality indicator (MH-CQI) feedback is described. Hypotheses corresponding to rank indicator (RI) and precoding matrix indicator (PMI) assumptions associated with a dominant interferer are selected. Multi-hypothesis channel quality indicator (MH-CQI) values are generated based on the selected hypotheses. The multi-hypothesis channel quality indicator (MH-CQI) values are encoded. The multi-hypothesis channel quality indicator (MH-CQI) values are sent as feedback.

The method may be performed by a wireless communication device. The multi-hypothesis channel quality indicator (MH-CQI) values may be sent to one or more base stations.

Encoding the multi-hypothesis channel quality indicator (MH-CQI) values may use wideband encoding. The multi-hypothesis channel quality indicator (MH-CQI) values may be computed as wideband offsets to conventional channel quality indicator (CQI) values.

The selected hypotheses may be based on a combination of semi-static and dynamic signaling received. The selected hypotheses may also include an additional rank-1 constrained precoding matrix indicator (PMI) whenever the selected rank indicator (RI) is greater than 1. The selected hypotheses may additionally include all rank-1 precoding matrix indicators (PMIs) of a dominant interferer.

The selected hypotheses may be based in part on a serving rank indicator (RI) and a precoding matrix indicator (PMI) selected as part of a conventional serving precoding matrix indicator (PMI). The selected hypotheses may also include nulling hypotheses from the dominant interferer. The nulling hypotheses may be considered separately. The selected hypotheses may additionally be based on a table. The table may provide a mapping to the precoding matrix indicator (PMI).

The dominant interferer may be determined. A signal indicating the dominant interferer may be sent. A signal indicating the dominant interferer may be received. Multi-hypothesis channel quality indicator (MH-CQI) feedback may be provided only when a coordinated precoding type indicator (cPTI) is enabled.

A method for receiving multi-hypothesis channel quality indicator feedback is also described. Multi-hypothesis channel quality indicator (MH-CQI) values are received. The multi-hypothesis channel quality indicator (MH-CQI) values are used for improved scheduling.

The method may be performed by a base station. The multi-hypothesis channel quality indicator (MH-CQI) values may be received from a wireless communication device. The scheduling may include single-cell multi-user multiple-input and multiple-output (MU-MIMO) scheduling. The single-cell multi-user multiple-input and multiple-output (MU-MIMO) scheduling may include at least one of wireless communication device pairing and rate prediction. The scheduling may also include scheduling within a coordinated multipoint (CoMP) cluster.

A signal to a wireless communication device indicating whether to compute and report multi-hypothesis channel quality indicator (MH-CQI) values may be sent. The signal may include a coordinated precoding type indicator (cPTI). A dominant interferer may be signaled. The signaling may include a combination of semi-static and dynamic signaling. A set of hypotheses to generate the multi-hypothesis channel quality indicator (MH-CQI) values may be signaled. The set of hypotheses may be signaled by a combination of semi-static and dynamic signaling.

All wireless communication devices associated with a remote radio head (RRH) may be instructed to periodically feedback multi-hypothesis channel quality indicator (MH-CQI) values. All possible transmission hypotheses may be exhausted. A scheduling decision for each transmission hypothesis may be made. A cluster-wide utility metric may be computed as a sum of fairness utility metrics associated with individual coordinating transmission points. The transmission hypothesis that corresponds to a maximum cluster-wide utility metric may be selected. The scheduling decisions of all cells in the cluster associated may be finalized with the selected transmission hypothesis.

Making the scheduling decision for each transmission hypothesis may include selecting a channel quality indicator according to a macro transmission hypothesis. A single-cell scheduling algorithm based on one or more fairness constraints may be run. A fairness utility metric for each remote radio head (RRH) may be obtained.

The maximum cluster-wide utility metric may be based on the channel state information (CSI) of wireless communication devices associated with different cells. The channel state information (CSI) may be based on the multi-hypothesis channel quality indicator (MH-CQI) values. The wireless communication devices may use multiple hypotheses to compute the multi-hypothesis channel quality indicator (MH-CQI) values.

Muting and codebook-based precoded transmissions may be used for all beams in a codebook. Wireless communication devices compatible with the selected transmission hypothesis may be scheduled. Low power node scheduling decisions may be based on the selected transmission hypothesis. A pending retransmission may use the selected transmission hypothesis without optimization.

An apparatus for providing multi-hypothesis channel quality indicator (MH-CQI) feedback is also described. The apparatus includes a processor, memory in electronic communication with the processor and instructions stored in the memory. The instructions are executable by the processor to select hypotheses corresponding to rank indicator (RI) and precoding matrix indicator (PMI) assumptions associated with a dominant interferer. The instructions are also executable by the processor to generate multi-hypothesis channel quality indicator (MH-CQI) values based on the selected hypotheses. The instructions are additionally executable by the processor to encode the multi-hypothesis channel quality indicator (MH-CQI) values. The instructions are further executable by the processor to send the multi-hypothesis channel quality indicator (MH-CQI) values as feedback.

An apparatus for providing multi-hypothesis channel quality indicator (MH-CQI) feedback is also described. The apparatus includes a processor, memory in electronic communication with the processor and instructions stored in the memory. The instructions are executable by the processor to receive multi-hypothesis channel quality indicator (MH-CQI) values. The instructions are also executable by the processor to use the multi-hypothesis channel quality indicator (MH-CQI) values for improved scheduling.

A wireless device is also described. The wireless device includes means for selecting hypotheses corresponding to rank indicator (RI) and precoding matrix indicator (PMI) assumptions associated with a dominant interferer. The wireless device also includes means for generating multi-hypothesis channel quality indicator (MH-CQI) values based on the selected hypotheses. The wireless device additionally includes means for encoding the multi-hypothesis channel quality indicator (MH-CQI) values. The wireless device further includes means for sending the multi-hypothesis channel quality indicator (MH-CQI) values as feedback.

Another wireless device is also described. The wireless device includes means for receiving multi-hypothesis channel quality indicator (MH-CQI) values. The wireless device also includes means for using the multi-hypothesis channel quality indicator (MH-CQI) values for improved scheduling.

A computer-program product for providing multi-hypothesis channel quality indicator (MH-CQI) feedback is also described. The computer-program product includes a non-transitory computer-readable medium having instructions thereon. The instructions include code for causing a wireless communication device to select hypotheses corresponding to rank indicator (RI) and precoding matrix indicator (PMI) assumptions associated with a dominant interferer. The instructions also include code for causing the wireless communication device to generate multi-hypothesis channel quality indicator (MH-CQI) values based on the selected hypotheses. The instructions additionally include code for causing the wireless communication device to encode the multi-hypothesis channel quality indicator (MH-CQI) values. The instructions further include code for causing the wireless communication device to send the multi-hypothesis channel quality indicator (MH-CQI) values as feedback.

A computer-program product for receiving multi-hypothesis channel quality indicator (MH-CQI) feedback is also described. The computer-program product includes a non-transitory computer-readable medium having instructions thereon. The instructions include code for causing a base station to receive multi-hypothesis channel quality indicator (MH-CQI) values. The instructions also include code for causing the base station to use the multi-hypothesis channel quality indicator (MH-CQI) values for improved scheduling.

DETAILED DESCRIPTION

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices. In 3GPP LTE, a mobile station or device may be referred to as a "user equipment" (UE).

The systems and methods disclosed herein may be described with reference to one or more specifications, such as 3GPP Release-8, 3GPP Release-9, 3GPP Release-10, LTE and Long Term Evolution Advanced (LTE-A). However, the concepts may also be applied to other wireless communication systems.

Figure 1:
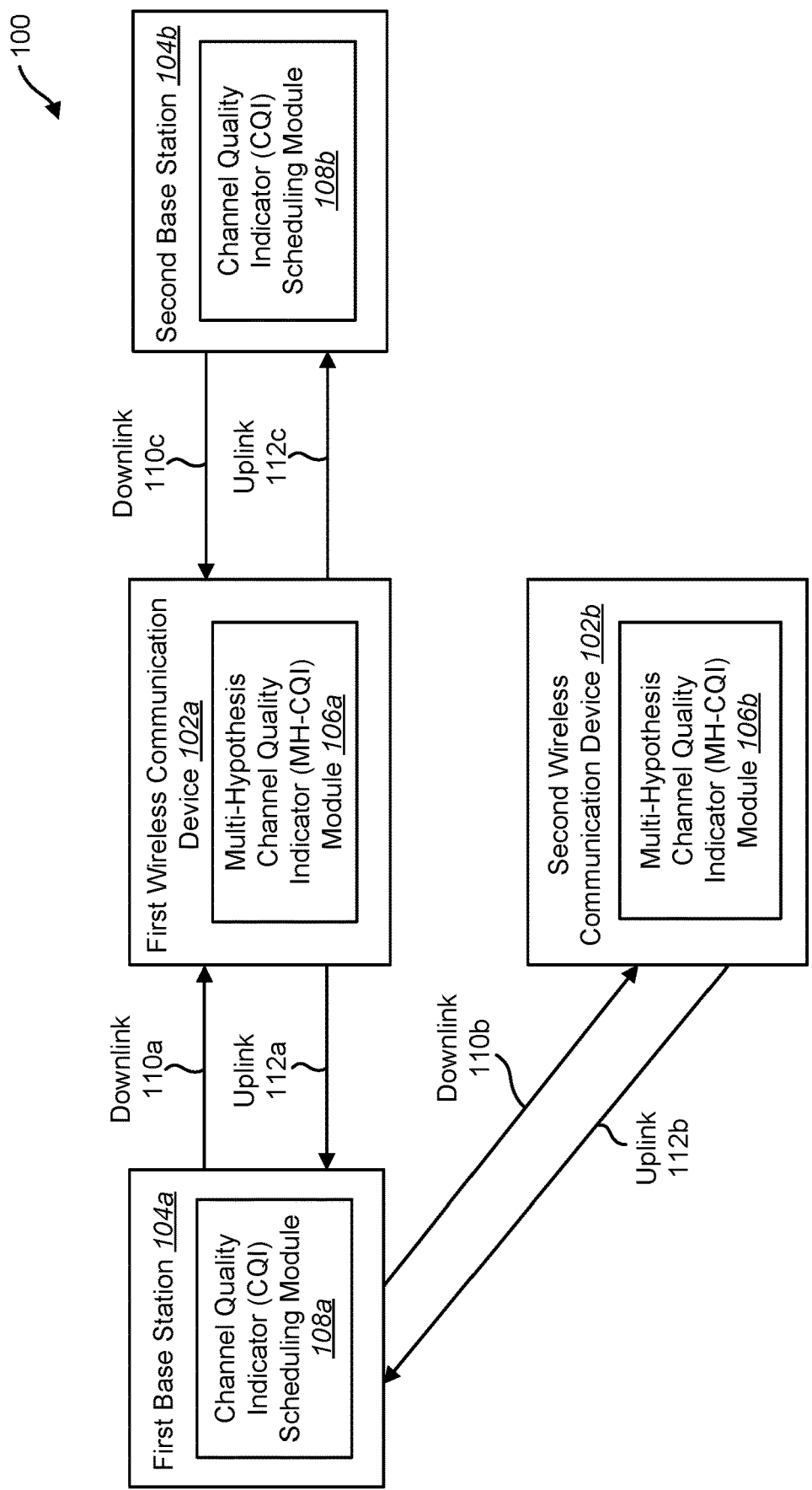
FIG. 1 shows a wireless communication system with multiple wireless devices.

FIG. 1 shows a wireless communication system 100 with multiple wireless devices. Wireless communication systems 100 are widely deployed to provide various types of communication content such as voice, data, and so on. A wireless device may be a wireless communication device 102 or a base station 104.

A base station 104 is a station that communicates with one or more wireless communication devices 102. A base station 104 may also be referred to as, and may include some or all of the functionality of, an access point, a broadcast transmitter, a NodeB, an evolved NodeB, etc. The term "base station" will be used herein. Each base station 104 provides communication coverage for a particular geographic area. A base station 104 may provide communication coverage for one or more wireless communication devices 102. The term "cell" can refer to a base station 104 and/or its coverage area depending on the context in which the term is used.

A wireless communication device 102 may also be referred to as, and may include some or all of the functionality of, a terminal, an access terminal, a user equipment (UE), a subscriber unit, a station, etc. A wireless communication device 102 may be a cellular phone, a personal digital assistant (PDA), a wireless device, a wireless modem, a handheld device, a laptop computer, etc.

Communications in a wireless system 100 (e.g., a multiple-access system) may be achieved through transmissions over a wireless link. Such a communication link may be established via a single-input and single-output (SISO), multiple-input and single-output (MISO), multiple-input and multiple-output (MIMO), or a coordinated multipoint (CoMP) system. A MIMO system includes transmitter(s) and receiver(s) equipped, respectively, with multiple (NT) transmit antennas and multiple (NR) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system 100 may utilize MIMO. A MIMO system may support both time division duplex (TDD) and frequency division duplex (FDD) systems. In a TDD system, uplink 112a-c and downlink 110a-c transmissions are on the same frequency region so that the reciprocity principle allows the estimation of the downlink 110 channel from the uplink 112 channel. This enables a transmitting wireless device to extract transmit beamforming gain from communications received by the transmitting wireless device.

The wireless communication system 100 may be a multiple-access system capable of supporting communication with multiple wireless communication devices 102 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for LTE, and LTE terminology is used in much of the description below.

A base station 104 may communicate with one or more wireless communication devices 102. For example, in a multi-user multiple-input and multiple-output (MU-MIMO) configuration, the first base station 104a (e.g., the serving point) may communicate with a first wireless communication device 102a and a second wireless communication device 102b. In this configuration, the first base station 104a may be the dominant interferer. In other words, a transmission sent from the first base station 104a intended for another wireless communication device 102 may be the primary source of interference at a wireless communication device 102.

In the multi-user multiple-input and multiple-output (MU-MIMO) case, the first base station 104a may communicate with the first wireless communication device 102a on a first downlink 110a and/or a first uplink 112a. The first base station 104a may also communicate with the second wireless communication device 102b on a second downlink 110b and/or a second uplink 112b. Each of the wireless communication devices 102a-b may include a multi-hypothesis channel quality indicator (MH-CQI) module 106a, 106b and the first base station 104a may include a channel quality indicator (CQI) module 108a for implementing the systems and methods as described below. The downlink 110 (or forward link) refers to the communication link from a base station 104 to a wireless communication device 102, and the uplink 112 (or reverse link) refers to the communication link from a wireless communication device 102 to a base station 104.

A wireless communication device 102 may communicate with zero, one, or multiple base stations 104 on the downlink 110 and/or uplink 112 at any given moment. For example, in a coordinated multipoint (CoMP) configuration, a wireless communication device 102a may communicate with a first base station 104a and a second base station 104b. The wireless communication device 102a may communicate with the first base station 104a on a first downlink 110a and/or a first uplink 112a. The wireless communication device 102a may also communicate with the second base station 104b on a third downlink 110c and/or a third uplink 112c. The second base station 104b may also include a channel quality indicator (CQI) module 108b for implementing the systems and methods as described below.

Multiple channels may be used between a base station 104 and a wireless communication device 102 on both the downlink 110 and the uplink 112. A physical uplink shared channel (PUSCH) may be used to transmit user data from a wireless communication device 102 to a base station 104. A physical uplink control channel (PUCCH) may be used to transport user signaling data from a wireless communication device 102 to a base station 104. A physical downlink shared channel (PDSCH) may be used to transmit common user data and control information from a base station 104 to a wireless communication device 102. A physical downlink control channel (PDCCH) may be used to transmit control information from a base station 104 to a wireless communication device 102.

Based on communications received from one or more base stations 104a-b, a wireless communication device 102 may generate one or more channel quality indicators (CQIs). Each channel quality indicator (CQI) may be associated with a channel measurement for the downlink 110 channel between the one or more base stations 104a-b and the wireless communication device 102. Each channel quality indicator (CQI) may be conditioned on certain interference assumptions. A channel quality indicator (CQI) may be dependent on the transmission scheme used in the wireless communications system 100.

Additional channel quality indicator (CQI) feedback may capture the additional interference that is present when another wireless communication device 102 is scheduled on the same time and/or frequency resources. If multi-user multiple-input and multiple-output (MU-MIMO) communication is used between a base station 104 and a wireless communication device 102, each channel quality indicator (CQI) may correspond to different co-scheduled users. With multi-user multiple-input and multiple-output (MU-MIMO), additional interference may result from a co-scheduled wireless communication device 102 of the same transmission point, i.e., the interference may be associated with the serving transmission point. With coordinated multipoint (CoMP), the additional interference does not come from a co-scheduled wireless communication device 102 (as in MU-MIMO) of the same base station 104, but from a geographically separated transmission point (e.g., a base station 104).

A wireless communication device 102 may use the channel quality indicators (CQIs) to determine a preferred beam. A preferred beam may refer to the antenna structure, weight, transmission direction and phase of a signal transmitted by a base station 104 to the wireless communication device 102. The terms "beam" and "precoding vector" may refer to the direction in which data is streamed wirelessly from an antenna. In multiple-input and multiple-output (MIMO), multiple beams may be used to transmit information between a base station 104 and a wireless communication device 102. A preferred beam may thus refer to a beam that produces the best (i.e., the optimal) data stream between the base station 104 and the wireless communication device 102.

Multi-user multiple-input and multiple-output (MU-MIMO) may increase user throughputs on the downlink 110 over traditional single-user multiple-input and multiple-output (SU-MIMO) by making more intelligent use of the base station 104 resources. Multi-user multiple-input and multiple-output (MU-MIMO) may enable an increase in throughput for a particular transmission time interval (TTI) compared with dual-stream transmission to a single wireless communication device 102. A base station 104 may thus determine whether to use dual downlink data streams for a single wireless communication device 102a (i.e., SU-MIMO) or to use a first data stream for a first wireless communication device 102a and a second data stream (e.g., orthogonal to the first data stream) for a second wireless communication device 102b (i.e., multi-user multiple-input and multiple-output (MU-MIMO)).

With multi-user multiple-input and multiple-output (MU-MIMO), a channel quality indicator (CQI) may correspond to a request for a single-stream transmission or a dual-stream transmission. For example, a wireless communication device 102 may include multiple channel quality indicators (CQIs). The wireless communication device 102 may generate multiple channel quality indicators (CQIs) for each transmission time interval (TTI). A wireless communication device 102 may not send every channel quality indicator (CQI) to the base station 104 for every transmission time interval (TTI). In some configurations, a wireless communication device 102 may send only the optimal channel quality indicator (CQI) to the base station 104 for each transmission time interval (TTI).

If the wireless communication device 102 determines that it has good geometry with respect to the base station 104 (e.g., the channel quality between the base station 104 and the wireless communication device 102 is above a threshold), the wireless communication device 102 may send an optimal dual-stream multiple-input and multiple-output (MIMO) channel quality indicator (CQI) to the base station 104. If the wireless communication device 102 determines that it has bad geometry with respect to the base station 104 (e.g., the channel quality between the base station 104 and the wireless communication device 102 is below the threshold), the wireless communication device 102 may send an optimal single-stream multiple-input and multiple-output (MIMO) channel quality indicator (CQI) to the base station 104.

With coordinated multi-point (CoMP) transmission, multiple base stations 104a-b may be coordinated (e.g., scheduled) for transmission and reception by one or more wireless communication devices 102. In a coordinated multipoint (CoMP) system, a wireless communication device 102a may overlap two cells (e.g., the coverage area of the first base station 104a and the second base station 104b). The base stations 104a-b may jointly preprocess the information for the wireless communication device 102a prior to transmission. As a result of the preprocessing, signals are constructively transmitted to the wireless communication device 102a but are eliminated at the antennas of other users (e.g., the wireless communication device 102b). Therefore, a wireless communication device 102a in a coordinated multipoint (CoMP) network behaves as if it were in an isolated cell because it is not interrupted by the data traffic in neighboring cells.

Each base station 104 may include a channel quality indicator (CQI) module 108a-b. The channel quality indicator (CQI) module 108 may use multi-hypothesis channel quality indicator (MH-CQI) values to improve scheduling and rate prediction. For example, the channel quality indicator (CQI) module 108 may use the multi-hypothesis channel quality indicator (MH-CQI) values to improve scheduling of the physical downlink shared channel (PDSCH) (e.g., downlink 110 data). Additionally, the channel quality indicator (CQI) module 108 may schedule feedback payloads on the uplink 112 (e.g., on the physical uplink shared channel (PUSCH) or the physical uplink control channel (PUCCH)) based on received multi-hypothesis channel quality indicator (MH-CQI) values.

Each wireless communication device 102 may include a multi-hypothesis channel quality indicator (MH-CQI) module 106a-b. The multi-hypothesis channel quality indicator (MH-CQI) module 106 may be used by the wireless communication device 102 to generate and send multi-hypothesis channel quality indicators (MH-CQI) values to a base station 104.

The use of channel quality indicators (CQI) is an important component of LTE channel state information (CSI) feedback reporting that may enable a base station 104 to perform scheduling and modulation and coding scheme (MCS) selection in a way that reflects current channel conditions of a wireless communication device 102. In many transmission modes and feedback schemes, the channel quality indicator (CQI) is conditioned on a certain precoding matrix indicator (PMI) and rank indicator (RI). Therefore, the channel quality indicator (CQI) may be viewed as a function of the precoding matrix indicator (PMI) and rank indicator (RI) that are used for the actual transmission.

In a multi-user multiple-input and multiple-output (MU-MIMO) network, where multiple wireless communication devices 102a-b are scheduled on the same time/frequency resources, channel quality indicator (CQI) feedback cannot be applied directly for modulation and coding scheme (MCS) selection. Instead, the channel quality indicator (CQI) value (which is computed under a conventional SU-MIMO assumption) should be adjusted to reflect any power splitting (e.g., when the base station 104 is serving two wireless communication devices 102 instead of one on a given resource) and interference from co-scheduled layers. However, it is difficult to account for the additional interference adequately as precoding matrix indicator (PMI) granularity may be too coarse to accurately predict this type of interference.

The difficulty of accurately extrapolating channel quality indicator (CQI) values under different multi-user multiple-input and multiple-output (MU-MIMO) co-scheduling assumptions motivates a type of multi-hypothesis channel quality indicator (MH-CQI) feedback in which one or more additional channel quality indicator (CQI) values (e.g., multi-hypothesis channel quality indicator (MH-CQI) values) may be provided that are indicative of different multi-user multiple-input and multiple-output (MU-MIMO) pairings. The one or more multi-hypothesis channel quality indicator (MH-CQI) values may be computed at the wireless communication device 102 even though the wireless communication device 102 may not possess any information about co-scheduled wireless communication devices 102. Instead, a wireless communication device 102 may include a multi-hypothesis channel quality indicator (MH-CQI) module 106 that may compute one or more multi-hypothesis channel quality indicator (MH-CQI) values under different assumptions (e.g., hypotheses) of co-scheduled wireless communication devices 102. For example, the wireless communication device 102 may make assumptions about the precoding matrix indicators (PMIs) of one or more co-scheduled wireless communication devices 102.

To avoid excessive overhead increase, wideband encoding of the one or more multi-hypothesis channel quality indicator (MH-CQI) values may be applied. In conventional channel quality indicator (CQI) reporting, a wideband report may provide one channel quality indicator (CQI) for the entire downlink 110 system bandwidth. For example, the wireless communication device 102 may report the channel quality indicator (CQI) by dividing the system bandwidth into multiple subbands, selecting a set of preferred subbands (e.g., the best M subbands) and then reporting one channel quality indicator (CQI) for the wideband.

Because multi-hypothesis channel quality indicator (MH-CQI) feedback increases feedback overhead (due to a wireless communication device 102 conveying additional channel quality indicator (CQI) information for each considered hypothesis), wideband encoding may reduce overhead. For example, while the conventional Rel-10 channel quality indicator (CQI) may be reported on a subband level, the multi-hypothesis channel quality indicator (MH-CQI) value may be reported with coarser granularity (e.g., in wideband). In one configuration, to continue providing subband information, the multi-hypothesis channel quality indicator (MH-CQI) value may be computed as an offset to the conventional (e.g., Rel-10) channel quality indicator (CQI) value. Therefore, the base station 104 may combine the conventional channel quality indicator (CQI) value and multi-hypothesis channel quality indicator (MH-CQI) value to find the desired "absolute" channel quality indicator (CQI) index for a certain hypothesis. Assuming that the change in channel quality indicator (CQI) (e.g., delta CQI) between conventional channel quality indicator (CQI) values and multi-hypothesis channel quality indicator (MH-CQI) values is fairly stable across frequency, the use of wideband reporting for one or more multi-hypothesis channel quality indicator (MH-CQI) values may lead to minimal performance degradation while introducing significant overhead saving.

With regard to overhead increase, it should be noted that if wideband encoding is used, it should be possible to convey multiple multi-hypothesis channel quality indicator (MH-CQI) values to the base station 104 without prohibitive feedback overhead increase. By way of illustration, in the context of Rel-10, physical uplink shared channel (PUSCH) 3-2 reporting was considered, which introduced precoding matrix indicator (PMI) feedback on a subband level that consumes up to four additional bits per subband. This overhead increase was deemed acceptable within the context of aperiodic feedback. Therefore, a similar usage of four bits per subband could well accommodate wideband delta multi-hypothesis channel quality indicator (MH-CQI). For a 10 megahertz (MHz) system, this comparison would allow for about eight multi-hypothesis channel quality indicator (MH-CQI) values with a similar overhead increase as physical uplink shared channel (PUSCH) 3-2.

In a coordinated multipoint (CoMP) system, it is desirable to improve channel quality indicator (CQI) feedback to reflect the coordination among different base stations 104a-b. Base stations 104 may be referred to as transmission points (referred to as just "points" in what follows) in a coordinated multipoint (CoMP) system. With coordinated multipoint (CoMP), multi-hypothesis channel quality indicator (MH-CQI) feedback may be accomplished in a similar way to multi-user multiple-input and multiple-output (MU-MIMO) operation. For example, the multi-hypothesis channel quality indicator (MH-CQI) module 106 may compute different multi-hypothesis channel quality indicator (MH-CQI) values under the assumption that specific non-serving base stations 104 (known to the wireless communication device 102 through either base station 104 signaling or wireless communication device 102 selection) perform transmission with a specific precoding matrix indicator (PMI) and rank indicator (RI). Similar to the multi-user multiple-input and multiple-output (MU-MIMO) case, wideband encoding may again be used to reduce overhead.

The enhanced channel quality indicator (CQI) feedback for multi-user multiple-input and multiple-output (MU-MIMO) and for coordinated multipoint (CoMP) described herein share several similarities. In both configurations, additional channel quality indicator (CQI) values (e.g., multi-hypothesis channel quality indicator (MH-CQI) values) may be sent from a wireless communication device 102 to a base station 104. These additional channel quality indicator (CQI) values may be computed under various rank indicator (RI) and precoding matrix indicator (PMI) hypotheses associated with a dominant interferer. In the multi-user multiple-input and multiple-output (MU-MIMO) case, the dominant interferer corresponds to the co-scheduled layers of the serving point (e.g., the first base station 104a). In the coordinated multipoint (CoMP) case, the dominant interferer corresponds with a specific transmission point (e.g., the second base station 104b) that is known to both the first base station 104a and the wireless communication device 102a through appropriate signaling. The similarity between multi-user multiple-input and multiple-output (MU-MIMO) configurations and coordinated multipoint (CoMP) configurations motivates the term "multi-hypothesis" feedback, as these configurations provide feedback of additional channel quality indicator (CQI) information under different interference assumptions.

Figure 2:
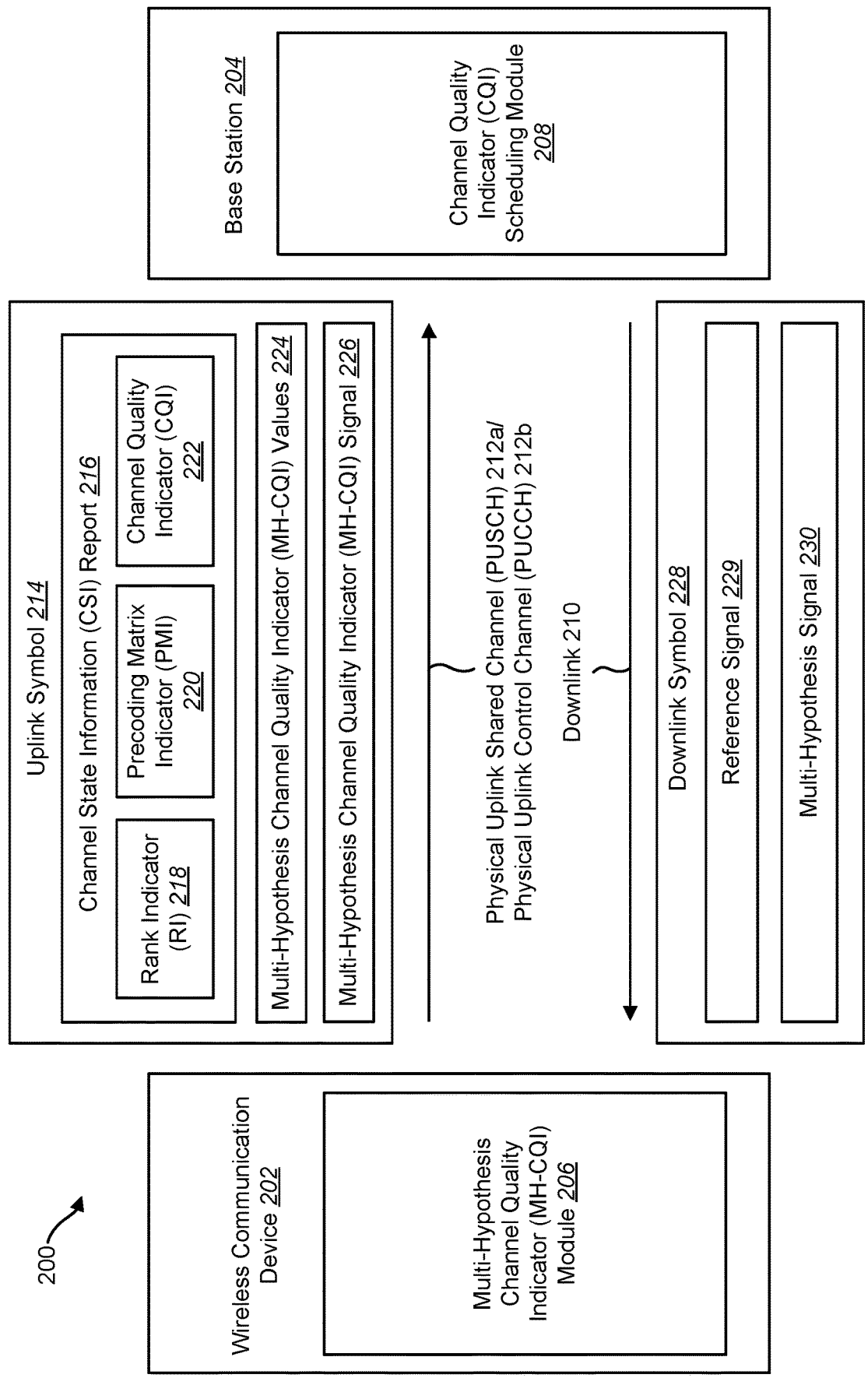
FIG. 2 is a block diagram illustrating a radio network operating in accordance with the systems and methods disclosed herein.

FIG. 2 is a block diagram illustrating a radio network 200 operating in accordance with the systems and methods disclosed herein. A wireless communication device 202 may include a multi-hypothesis channel quality indicator (MH-CQI) module 206. The multi-hypothesis channel quality indicator (MH-CQI) module 206 may compute multi-hypothesis channel quality indicator (MH-CQI) values 224 under different assumptions (e.g., hypotheses) that may be fed back to a base station 204. The base station may include a channel quality indicator (CQI) scheduling module 208. The channel quality indicator (CQI) scheduling module 208 may use the multi-hypothesis channel quality indicator (MH-CQI) values 224 to improve scheduling and rate prediction. The wireless communication device 202 may send the multi-hypothesis channel quality indicator (MH-CQI) values 224 in an uplink symbol 214. In one configuration, the uplink symbol 214 is sent on a physical uplink shared channel (PUSCH) 212a or a physical uplink control channel (PUCCH) 212b.

The uplink symbol 214 may include channel state information (CSI) that may be used by the base station 204 to schedule wireless transmissions. In one configuration, the uplink symbol 214 may include a channel state information (CSI) report 216. The channel state information (CSI) report 216 may include a combination of channel quality indicator (CQI) 222 information, precoding matrix indicator (PMI) 220 information and rank indicator (RI) 218 information. The rank indicator (RI) 218 may indicate the number of layers that can be supported on a channel (e.g., the number of layers that the wireless communication device 202 can distinguish). Spatial multiplexing (in a MIMO transmission, for example) can be supported only when the rank indicator (RI) 218 is greater than 1. The precoding matrix indicator (PMI) 220 may indicate a precoder out of a codebook (e.g., pre-agreed parameters) that the base station 204 may use for data transmission over multiple antennas based on the evaluation by the wireless communication device 202 of a received reference signal 229.

The uplink symbol 214 may also include one or more multi-hypothesis channel quality indicator (MH-CQI) values 224. The multi-hypothesis channel quality indicator (MH-CQI) values 224 may be based on selected hypotheses corresponding to assumptions about rank indicator (RI) and precoding matrix indicator (PMI) associated with a dominant interferer. In the case of multi-user multiple-input and multiple-output (MU-MIMO), the dominant interferer is the serving point (e.g., the base station 204). In the case of coordinated multipoint (CoMP), the dominant interferer is a different point that coordinates with the serving point of the wireless communication device 202. The selected hypotheses will be described in more detail in connection with FIG. 3.

The wireless communication device 202 may signal to the base station 204 the type of hypotheses that the one or more multi-hypothesis channel quality indicator (MH-CQI) values 224 are based on. Multi-hypothesis channel quality indicator (MH-CQI) feedback is used at the base station 204 to improve scheduling and rate prediction. To enable this operation, the wireless communication device 202 may signal to the base station 204 the hypotheses that were used to calculate the multi-hypothesis channel quality indicator (MH-CQI) values 224. The wireless communication device 202 may include one or more multi-hypothesis channel quality indicator (MH-CQI) signals 226. The channel quality indicator (CQI) signal 226 may indicate to the base station 204 which precoding matrix indicators (PMIs) were assumed for the multiple hypotheses. In the case of coordinated multipoint (CoMP) transmission, the multi-hypothesis channel quality indicator (MH-CQI) signal 226 may also indicate which dominant interferer was considered by the wireless communication device 202. In one configuration, the multi-hypothesis channel quality indicator (MH-CQI) signal 226 may include a coordinated precoding type indicator (cPTI) as described below in connection with FIG. 3.

The base station 204 may send a downlink symbol 228 to the wireless communication device 202 on the downlink 210. The downlink symbol 228 may include a multi-hypothesis signal 230. In general, a combination of semi-static and/or dynamic signaling could be considered in support of multi-hypothesis channel quality indicator (MH-CQI) feedback. For example, semi-static signaling may be used to configure the dominant interferer but dynamic signaling could be used to trigger certain multi-hypothesis channel quality indicator (MH-CQI) feedback under certain sets of hypotheses. Several sets of hypotheses may be configured by semi-static signaling. Each set of hypotheses may include a certain number of interference hypotheses. Through dynamic signaling, one or more of these sets of hypotheses may be selected and the associated hypotheses may then be used by the wireless communication device 202 for the multi-hypothesis channel quality indicator (MH-CQI) feedback. Therefore, the base station 204 may inform the wireless communication device 202 of the dominant interferer by using a combination of semi-static and/or dynamic signaling.

Multi-hypothesis channel quality indicator (MH-CQI) feedback may also be tied to channel state information (CSI) subframe sets, in which clean and unclean channel quality indicators (CQIs) 222 may be reported. The dominant interferer may be configured differently for either case (e.g., during clean and unclean subframe channel state information (CSI) subframe sets). Channel state information (CSI) subframe sets were introduced for enhanced inter-cell interference coordination. The clean and unclean subframes may represent subframes on which a strong interferer (e.g., a macro cell) may be blanking or active, respectively. For clean subframes, the macro cell may be turned off or may transmit with reduced power. Therefore, the wireless communication device 202 may be configured to report on different dominant interferers as a function of the subframe times. In other words, on clean subframes, the wireless communication device 202 may provide multi-hypothesis channel quality indicator (MH-CQI) feedback for a second dominant interferer because the first dominant interferer may be muted.

Figure 3:
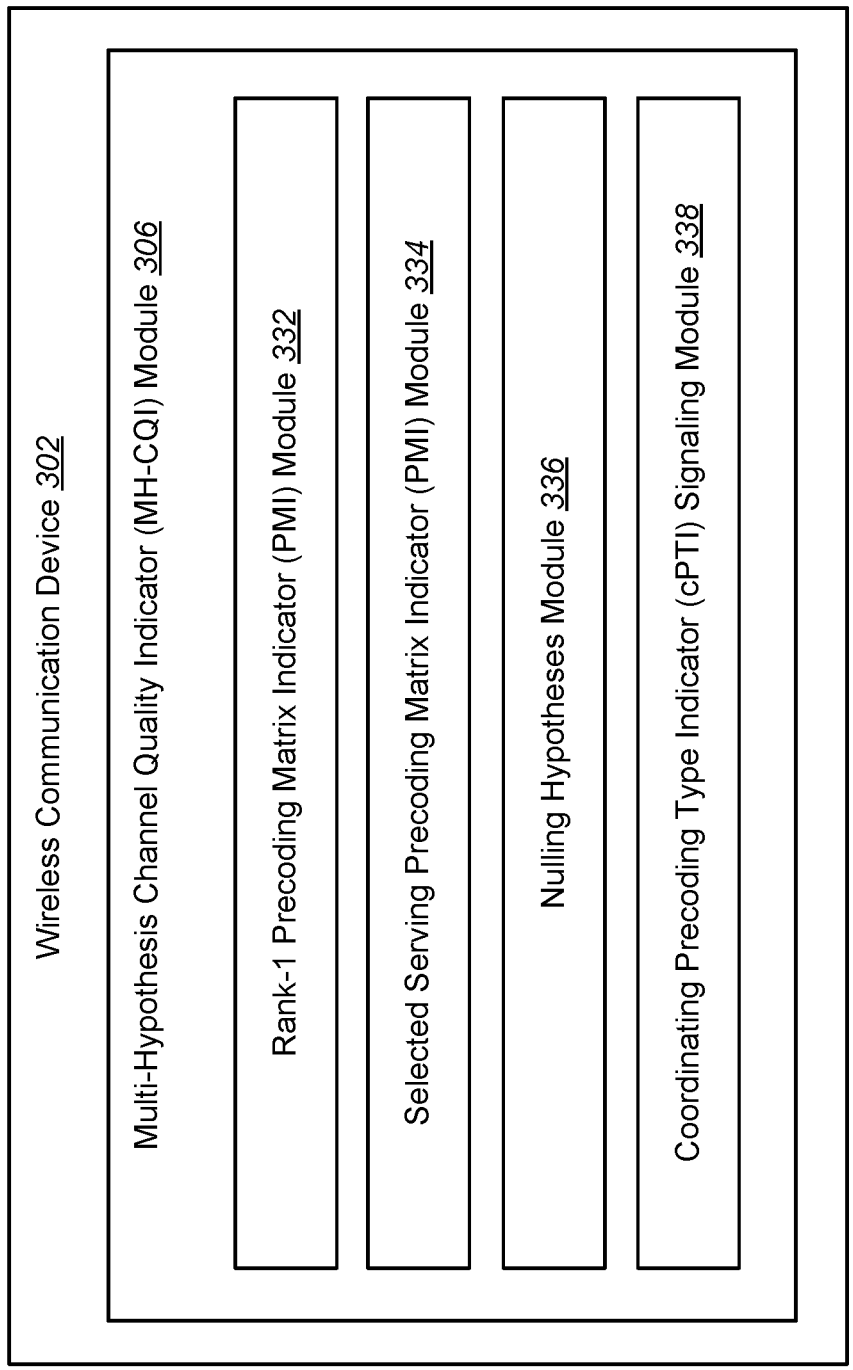
FIG. 3 is a block diagram of a wireless communication device for use in the present systems and methods.

FIG. 3 is a block diagram of a wireless communication device 302 for use in the present systems and methods. The wireless communication device 302 includes a multi-hypothesis channel quality indicator (MH-CQI) module 306 to generate additional channel quality indicator (CQI) values (e.g., multi-hypothesis channel quality indicator (MH-CQI) values 224) based on selected hypotheses corresponding to assumptions about the rank indicator (RI) and precoding matrix indicator (PMI) associated with a dominant interferer. As described above, the multi-hypothesis channel quality indicator (MH-CQI) values 224 may be sent to a base station 204 to improve scheduling and rate prediction.

The multi-hypothesis channel quality indicator (MH-CQI) module 306 may determine whether the dominant interferer is a serving point. For example, if the wireless communication device 302 is participating in a multi-user multiple-input and multiple-output (MU-MIMO) transmission, the dominant interferer is the first base station 104a (e.g., the serving point) providing the multi-user multiple-input and multiple-output (MU-MIMO) transmission. The multi-hypothesis channel quality indicator (MH-CQI) module 306 may also determine whether the dominant interferer is not a serving point. For example, if the wireless communication device 302 is participating in a coordinated multi-point (CoMP) transmission, the dominant interferer is a non-serving base station (i.e., the second base station 104b) (e.g., the non-serving point) that coordinates with the serving base station (i.e., the first base station 104a).

The multi-hypothesis channel quality indicator (MH-CQI) module 306 may include a rank-1 precoding matrix indicator (PMI) module 332. When computing the multi-hypothesis channel quality indicator (CQI) values 224, an important factor is what to assume for the serving point. In both multi-user multiple-input and multiple-output (MU-MIMO) and coordinated multipoint (CoMP) transmissions, the multi-hypothesis channel quality indicator (MH-CQI) value 224 may be most useful when the rank indicator (RI) of the serving point is equal to 1. Therefore, the rank-1 precoding matrix indicator (PMI) module 332 may generate multi-hypothesis channel quality indicator (MH-CQI) values 224 using a hypothesis that the rank indicator (RI) of the serving point is equal to 1. However, because multi-hypothesis channel quality indicator (MH-CQI) feedback is integrated with a traditional RI/PMI/CQI feedback framework (in which the wireless communication device 302 is free to choose the rank indicator (RI) autonomously), a precoding matrix indicator (PMI) conditioned on a rank indicator (RI) that is constrained to equal 1 should be made known to the base station 204. Therefore, the base station 204 may interpret the one or more multi-hypothesis channel quality indicator (MH-CQI) values 224 appropriately.

An important consideration in multi-hypothesis channel quality indicator (MH-CQI) feedback is which hypotheses to report. In one configuration, all the rank-1 constrained precoding matrix indicators (PMIs) of the dominant interferer may be considered as separate hypotheses. Therefore, the hypotheses selected by the rank-1 precoding matrix indicator (PMI) module 332 may include all rank-1 precoding matrix indicators (PMIs) in a codebook. Each of the rank-1 precoding matrix indicators (PMIs) may be reported as separate hypotheses. The preference to rank-1 precoding matrix indicators (PMIs) is motivated by the fact that for rank-1 interfering precoding matrix indicators (PMIs), the benefit of multi-hypothesis channel quality indicator (MH-CQI) feedback is expected to be most pronounced.

Multiple configurations may be used to convey the rank-1 constrained precoding matrix indicator (PMI) to the base station 204. In one configuration, an additional rank-1 constrained precoding matrix indicator (PMI) may be fed back to the base station 204 whenever the selected rank indicator (RI) is greater than 1. However, this approach comes at the expense of additional feedback overhead, which may not be desirable.

In another configuration, a unified feedback framework may be used to inform the base station 204 of a rank-1 constrained precoding matrix indicator (PMI). In this configuration, the rank-1 constrained precoding matrix indicator (PMI) may be inferred (by the base station 204) from a higher-rank precoding matrix indicator (PMI) (typically when the rank indicator (RI) equals 2) by selecting appropriate layers of the precoding matrix (e.g., the layer corresponding to the codeword with a higher channel quality indicator (CQI) value).

The multi-hypothesis channel quality indicator (MH-CQI) module 306 may further include a selected serving precoding matrix indicator (PMI) module 334. The selected serving precoding matrix indicator (PMI) module 334 may compute multi-hypothesis channel quality indicator (MH-CQI) values 224 based on a selected serving precoding matrix indicator (PMI). In other words, the hypotheses (about the dominant interferer) used by the selected serving precoding matrix indicator (PMI) module 334 may be based on a selected serving precoding matrix indicator (PMI). For example, the selected serving precoding matrix indicator (PMI) module 334 may generate multi-hypothesis channel quality indicator (MH-CQI) values 224 using hypotheses based on the serving rank indicator (RI) and/or precoding matrix indicator (PMI) selected by the wireless communication device 302 as part of the conventional serving precoding matrix indicator (PMI) for the wireless communication device 302.

Basing hypotheses on a selected serving precoding matrix indicator (PMI) may be especially useful in the context of multi-user multiple-input and multiple-output (MU-MIMO) where some precoding matrix indicators (PMIs) may more likely be co-scheduled with the serving precoding matrix indicator (PMI) than others. Therefore, the selected hypotheses may be selected as a function of the selected serving precoding matrix indicator (PMI). For example, the selected serving precoding matrix indicator (PMI) module 334 may generate multi-hypothesis channel quality indicator (MH-CQI) values 224 based on a lookup table that provides a mapping to the serving precoding matrix indicator (PMI). To facilitate this dependence of hypotheses, a table that provides this mapping (such as Table 1 below) may be added to the specification.

TABLE 1

MU-MIMO Pairing Assumptions

| Own PMI | Co-scheduled precoding matrix indicator (PMI) assumption | |
|---|---|---|
| | Alt-1 | Alt-2 |
| 0 | {2} | {1, 2, 3} |
| 1 | {3} | {2, 3, 0} |

TABLE 1-continued

MU-MIMO Pairing Assumptions

| Own PMI | Co-scheduled precoding matrix indicator (PMI) assumption | |
|---|---|---|
| | Alt-1 | Alt-2 |
| 2  | {0}  | {3, 0, 1} |
| 3  | {1}  | {0, 1, 2} |
| 4  | {6}  | {5, 6, 7} |
| 5  | {7}  | {6, 7, 4} |
| 6  | {4}  | {7, 4, 5} |
| 7  | {5}  | {4, 5, 6} |
| 8  | {11} | {9, 10, 11} |
| 9  | {10} | {10, 11, 8} |
| 10 | {9}  | {11, 8, 9} |
| 11 | {8}  | {8, 9, 10} |
| 12 | {13} | {13, 14, 15} |
| 13 | {12} | {14, 15, 12} |
| 14 | {15} | {15, 12, 13} |
| 15 | {14} | {12, 13, 14} |

Based on the selected rank-1 precoding matrix indicator (PMI), the selected serving precoding matrix indicator (PMI) module 334 may assume that co-scheduled wireless communication devices 302 would likely correspond to orthogonal precoding matrix indicators (PMIs), as this is an indication that the intra-cell interference resulting from the co-scheduled wireless communication device 302 is relatively small. However, when considering a codebook (e.g., the 4Tx codebook), there may be three precoding matrix indicators (PMIs) that are orthogonal to any given precoding matrix indicator (PMI). To facilitate the multi-hypothesis channel quality indicator (MH-CQI) computation, two alternatives may be considered, as illustrated in Table 1. In a first alternative (Alt-1) one of the three orthogonal alternatives may be selected. In a second alternative (Alt-2) the wireless communication device 302 may assume that all of the co-scheduled wireless communication devices 302 are configured at once.

It should be noted that for Alt-2, it is not implied that the base station 104 will actually pursue an assignment in which four wireless communication devices 302 are co-scheduled at the same time. Instead, the base station 104 may rescale the channel quality indicator (CQI) based on this feedback corresponding to the targeted assignment.

Table 1 illustrates these two alternatives and shows the precoding matrix indicators (PMIs) that should be assumed as the co-scheduled layers for each selected precoding matrix indicator (PMI). At the wireless communication device 302, this table may be used to look up which co-scheduled layer should be assumed at the wireless communication device 302 for channel quality indicator (CQI) computation.

The multi-hypothesis channel quality indicator (MH-CQI) module 306 may also include a nulling hypotheses module 336. In the context of coordinated multipoint (CoMP), the nulling hypotheses correspond to the case where the point subject to multi-hypothesis channel quality indicator (MH-CQI) feedback is assumed to not transmit at all. Therefore, blanking (e.g., nulling) of the dominant interferer should also be considered as a separate hypothesis.

The multi-hypothesis channel quality indicator (MH-CQI) module 306 may also include a coordinated precoding type indicator (cPTI) signaling module 338. In the context of a coordinated multipoint (CoMP) transmission, the coordinated precoding type indicator (cPTI) signaling module 338 may perform coordinated precoding type indicator (cPTI) signaling. In coordinated precoding type indicator (cPTI) signaling, there may be two different feedback types from one wireless communication device 302. In one configuration, the wireless communication device 302 may generate and send a coordinated precoding type indicator (cPTI) to the base station 104. In another configuration, the wireless communication device 302 may receive a coordinated precoding type indicator (cPTI) from the base station 104.

The coordinated precoding type indicator (cPTI) may signal the type of interference situation to the wireless communication device 302 and/or the base station 104. If a coordinated precoding type indicator (cPTI) is equal to 0, this indicates that the wireless communication device 302 is not in a dominant interferer situation and the feedback from the wireless communication devices 302 is regular (e.g., non-CoMP) single cell feedback. If the coordinated precoding type indicator (cPTI) is equal to 1, this indicates that the wireless communication device 302 is in a dominant interferer situation and the feedback will reflect assumptions about the scheduling of the dominant interferer.

The coordinated precoding type indicator (cPTI) may turn multi-hypothesis channel quality indicator (MH-CQI) feedback on or off. For example, if the coordinated precoding type indicator (cPTI) is equal to 0, multi-hypothesis channel quality indicator (MH-CQI) feedback may be turned off because the wireless communication device 302 is not in a dominant interferer situation. Conversely, if the coordinated precoding type indicator (cPTI) is equal to 1, multi-hypothesis channel quality indicator (MH-CQI) feedback may be turned on. Therefore, multi-hypothesis channel quality indicator (MH-CQI) feedback may be provided only when a coordinated precoding type indicator (cPTI) is enabled. The coordinated precoding type indicator (cPTI) is enabled when the coordinated precoding type indicator (cPTI) is equal to 1. The coordinated precoding type indicator (cPTI) may be enabled by the wireless communication device 302 and/or the base station 104.

In one configuration, the coordinated precoding type indicator (cPTI) may be signaled by the base station 104 (so that the wireless communication device 302 provides the corresponding feedback). In another configuration, the wireless communication device 302 may determine the coordinated precoding type indicator (cPTI) itself and inform the base station 104 about the coordinated precoding type indicator (cPTI).

In one implementation, the coordinated precoding type indicator (cPTI) signaling module 338 may indicate the coordinated precoding type indicator (cPTI), together with the rank indicator (RI), similar to a Rel-10 precoding type indicator (PTI). In another implementation, the coordinated precoding type indicator (cPTI) may be semi-statically signaled based on a wireless communication device 302 reference signal received power (RSRP) report and a base station's 204 knowledge of the level of coordination.

Figure 4:
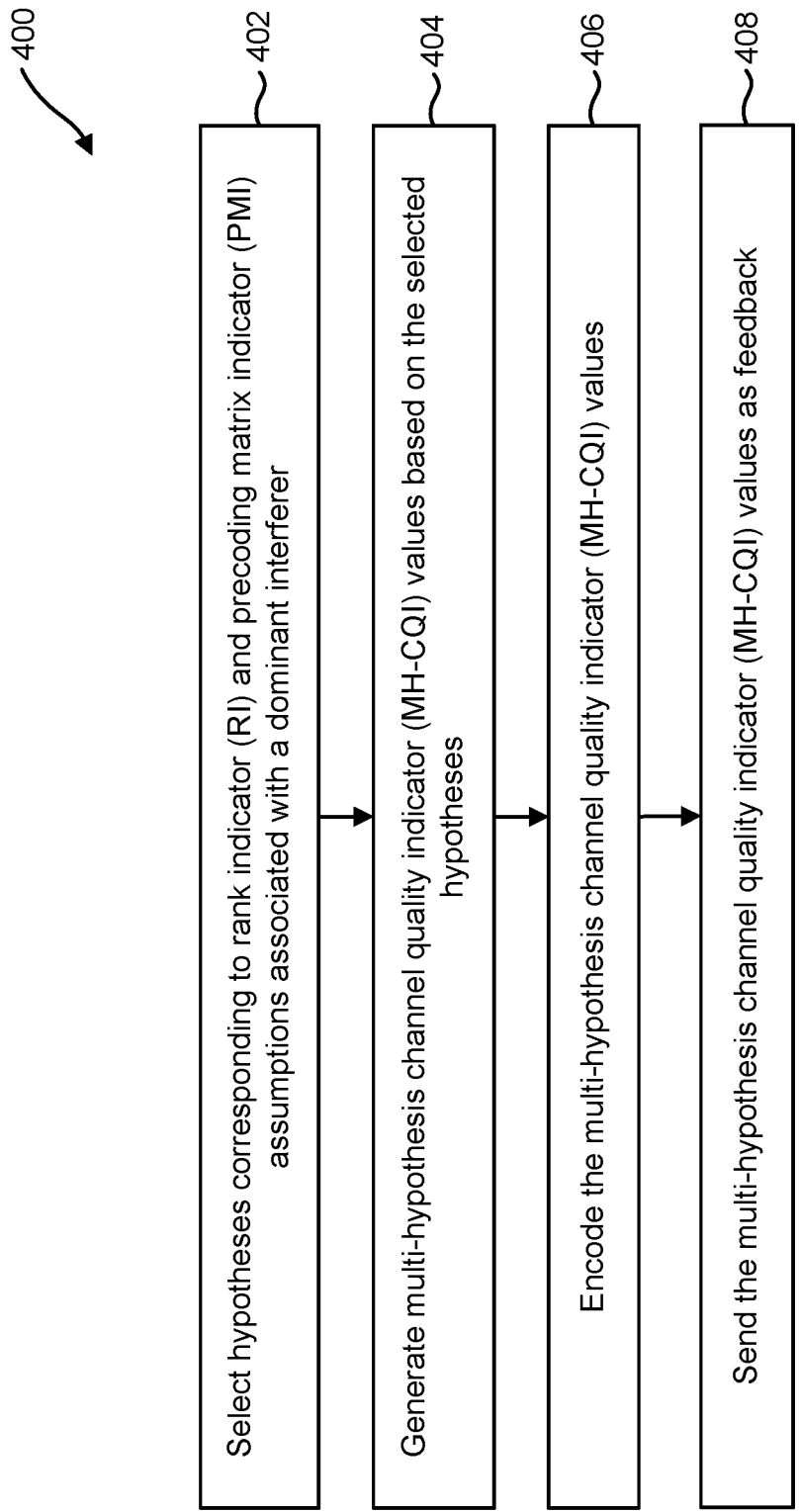
FIG. 4 is a flow diagram of a method for providing multi-hypothesis channel quality indicator (MH-CQI) feedback.

FIG. 4 is a flow diagram of a method 400 for providing multi-hypothesis channel quality indicator (MH-CQI) feedback. The method may be performed by a wireless communication device 102. The wireless communication device 102 may select 402 hypotheses corresponding to rank indicator (RI) and precoding matrix indicator (PMI) assumptions associated with a dominant interferer.

In one configuration, the wireless communication device 102 may select 402 hypotheses based on signaling from a base station 104. For example, the selected 402 hypotheses may be based on a combination of semi-static and dynamic signaling received. The base station 104 may indicate to the wireless communication device 102 one or more dominant interferers using a combination of semi-static and/or dynamic signaling. The wireless communication device 102 may also select 402 the hypotheses based on a signal from the base station 104 that includes a mapping (e.g., a lookup table) that indicates one or more dominant interferers to the wireless communication device 102.

In another example of selecting 402 hypotheses based on signaling from a base station 104, the wireless communication device 102 may select 402 hypotheses based on network signaling (e.g., signaling from the base station 104). The network signaling may indicate the hypotheses (e.g., which PMI is assumed as interference for multi-hypothesis channel quality indicator (MH-CQI) feedback) to the wireless communication device 102. This network signaling may include a selected serving precoding matrix indicator (PMI). The multi-hypothesis channel quality indicator (MH-CQI) values 224 for specific precoding matrix indicators (PMIs) may depend on the selected serving precoding matrix indicator (PMI). The wireless communication device 102 may make assumptions about a dominant interferer based on the selected serving precoding matrix indicator (PMI). For example, the wireless communication device 102 may select 402 hypotheses by a mapping (e.g., a lookup table). In one configuration, the mapping may be provided by a base station 104.

The selected 402 hypotheses may also include nulling hypotheses from the dominant interferer. For example, in a coordinated multipoint (CoMP) transmission, blanking of the dominant interferer may also be selected 402 as a separate hypothesis.

In another configuration, the wireless communication device 102 may independently select 402 hypotheses to determine one or more multi-hypothesis channel quality indicator (MH-CQI) values 224. In this configuration, the wireless communication device 102 may determine one or more dominant interferers. The wireless communication device 102 may report all assumptions (e.g., hypotheses) made, not just the hypotheses provided by the base station 104. For example, the wireless communication device 102 may select 402 hypotheses for all rank-1 precoding matrix indicators (PMIs). In this case, all the rank-1 constrained precoding matrix indicators (PMIs) of the dominant interferer may be considered as separate hypotheses. The wireless communication device 102 may additionally send (to the base station 104) a signal indicating the dominant interferer that was determined by the wireless communication device 102.

The wireless communication device 102 may generate 404 multi-hypothesis channel quality indicator (MH-CQI) values 224 based on the selected hypotheses. The wireless communication device 102 may generate 404 the multi-hypothesis channel quality indicator (MH-CQI) values 224 in a similar fashion as traditional channel quality indicator (CQI) values. However, the multi-hypothesis channel quality indicator (MH-CQI) values 224 may be generated 404 based on the hypotheses selected 402 by the wireless communication device. For example, in a multi-user multiple-input and multiple-output (MU-MIMO) case, the wireless communication device 102 may make assumptions about co-scheduled wireless communication devices 102. The wireless communication device 102 may then generate 404 multi-hypothesis channel quality indicator (MH-CQI) values 224 based on these assumptions, despite the wireless communication device 102 not having information about the co-scheduled wireless communication device 102. In the case of a coordinated multipoint (CoMP) transmission, the wireless communication device 102 may generate 404 different multi-hypothesis channel quality indicator (MH-CQI) values based on the assumption that specific non-serving points perform coordinated multipoint (CoMP) transmission with a specific rank indicator (RI) and a specific precoding matrix indicator (PMI).

The wireless communication device 102 may encode 406 the multi-hypothesis channel quality indicator (MH-CQI) values 224. In one configuration, the multi-hypothesis channel quality indicator (MH-CQI) values 224 may be reported in multiple subbands. In another configuration, the wireless communication device 102 may use wideband encoding 406 of the multi-hypothesis channel quality indicator (MH-CQI) values 224. For example, a multi-hypothesis channel quality indicator (MH-CQI) value 224 may be computed as a wideband offset value to the conventional channel quality indicator (CQI) value. The base station 104 may then combine the conventional channel quality indicator (CQI) value and multi-hypothesis channel quality indicator (MH-CQI) value 224 to find the absolute channel quality indicator (CQI) index for a certain hypothesis.

The wireless communication device 102 may send 408 the additional channel quality indicator (CQI) values (e.g., the multi-hypothesis channel quality indicator (MH-CQI) values 224) as feedback. In one configuration, the wireless communication device 102 may send 408 the multi-hypothesis channel quality indicator (MH-CQI) values 224 to one or more base stations 104. In the case of multi-user multiple-input and multiple-output (MU-MIMO), the wireless communication device 102 may send 408 the multi-hypothesis channel quality indicator (MH-CQI) values 224 to one base station 104. In the case of a coordinated multipoint (CoMP) transmission, the wireless communication device 102 may send 408 the multi-hypothesis channel quality indicator (MH-CQI) values 224 to multiple base stations 104.

In one configuration, the wireless communication device 102 may send 408 an uplink symbol 214 that includes the multi-hypothesis channel quality indicator (MH-CQI) values 224 on the physical uplink shared channel (PUSCH) 212a. In another configuration, the wireless communication device 102 may send 408 the uplink symbol 214 on the physical uplink control channel (PUCCH) 212b. In yet another configuration, the wireless communication device 102 may use a combination of the physical uplink shared channel (PUSCH) 212a and the physical uplink control channel (PUCCH) 212b to send 408 the uplink symbol 214.

Figure 5:
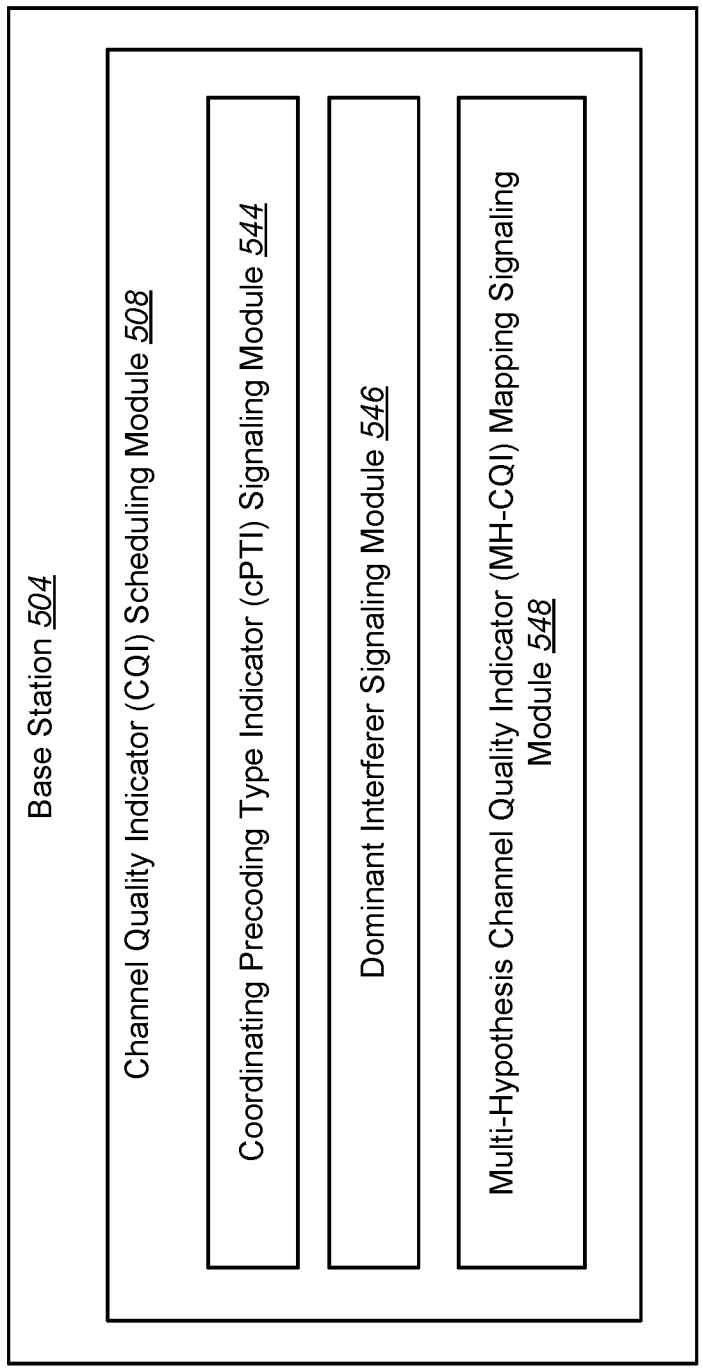
FIG. 5 is a block diagram of a base station for use in the present systems and methods.

FIG. 5 is a block diagram of a base station 504 for use in the present systems and methods. The base station 504 of FIG. 4 may be one configuration of the base stations 104a-b of FIG. 1. The base station 504 may receive multi-hypothesis channel quality indicator (MH-CQI) values 224 from one or more wireless communication devices 102. The base station 504 may include a channel quality indicator (CQI) scheduling module 508. The channel quality indicator (CQI) scheduling module 508 may use the multi-hypothesis channel quality indicator (MH-CQI) values 224 for improved scheduling and rate prediction. For example, the channel quality indicator (CQI) scheduling module 508 may perform scheduling and rate prediction for multi-user multiple-input and multiple-output (MU-MIMO) and/or coordinated multipoint (CoMP) transmissions.

To facilitate multi-hypothesis channel quality indicator (MH-CQI) feedback, the channel quality indicator (CQI) scheduling module 508 may include a coordinated precoding type indicator (cPTI) signaling module 544. The coordinated precoding type indicator (cPTI) signaling module 544 may configure a coordinated multipoint (CoMP) precoding type indicator (cPTI) to signal to one or more wireless communication devices 102 whether or not to compute and report multi-hypothesis channel quality indicator (MH-CQI) values 224. A wireless communication device 102 that receives a coordinated precoding type indicator (cPTI) may report multi-hypothesis channel quality indicator (MH-CQI) values 224 upon encountering dominant interference.

The channel quality indicator (CQI) scheduling module 508 may also include a dominant interferer signaling module 546. The dominant interferer signaling module 546 may use a combination of semi-static and/or dynamic signaling to convey the dominant interferer to one or more wireless communication devices 102. For example, semi-static signaling may be used to configure the dominant interferer while dynamic signaling may be used to trigger certain multi-hypothesis channel quality indicator (MH-CQI) under certain sets of hypotheses.

The channel quality indicator (CQI) scheduling module 508 may additionally include a multi-hypothesis channel quality indicator (MH-CQI) mapping signaling module 548. The multi-hypothesis channel quality indicator (MH-CQI) mapping signaling module 548 may provide a mapping to one or more wireless communication devices 102 to facilitate multi-hypothesis channel quality indicator (MH-CQI) feedback. In one configuration, a set of hypotheses that a wireless communication device 102 uses to generate multi-hypothesis channel quality indicator (MH-CQI) values 224 to be reported back to the base station 504 may be signaled to the wireless communication device 102 by a combination of semi-static and/or dynamic signaling.

Figure 6:
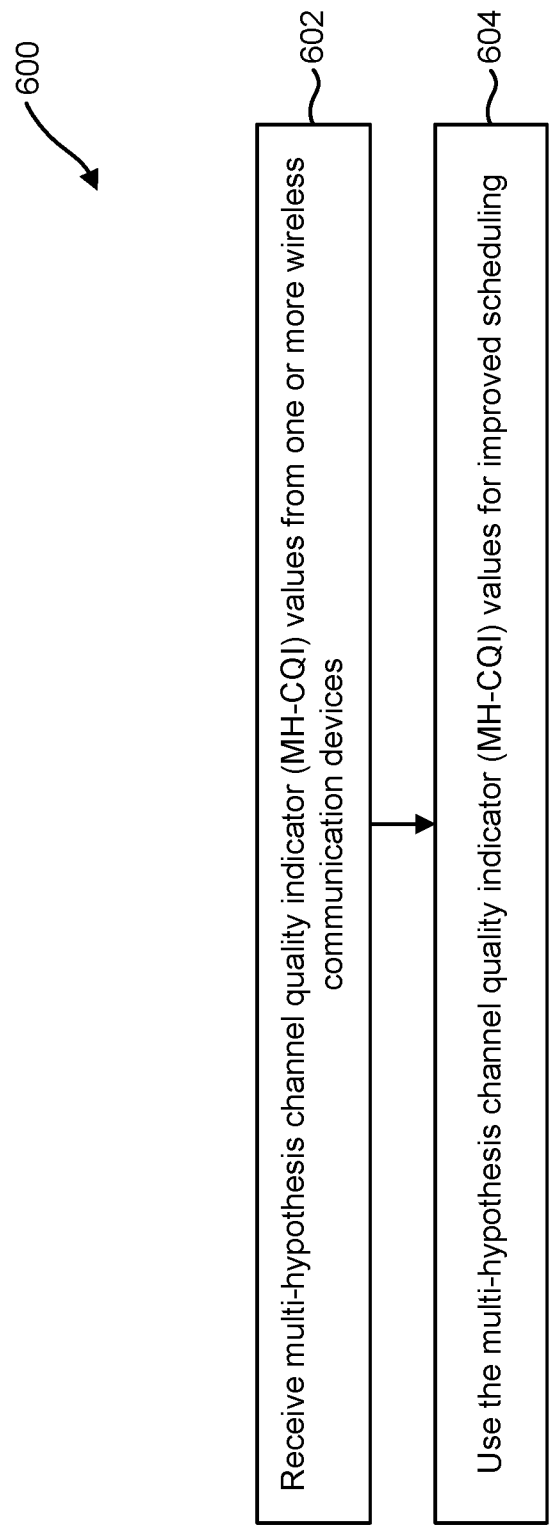
FIG. 6 is a flow diagram of a method for receiving multi-hypothesis channel quality indicator (MH-CQI) values.

FIG. 6 is a flow diagram of a method 600 for receiving multi-hypothesis channel quality indicator (MH-CQI) values 224. The method may be performed by a base station 104. The base station 104 may receive 602 multi-hypothesis channel quality indicator (MH-CQI) values 224. In one configuration, the base station 104 may receive 602 the multi-hypothesis channel quality indicator (MH-CQI) values 224 from one or more wireless communication devices 102. The base station 104 may receive 602 the multi-hypothesis channel quality indicator (MH-CQI) values 224 in an uplink symbol 214 that includes the multi-hypothesis channel quality indicator (MH-CQI) values 224. The multi-hypothesis channel quality indicator (MH-CQI) values 224 may be received 602 on a physical uplink shared channel (PUSCH) 212a. In another configuration, the multi-hypothesis channel quality indicator (MH-CQI) values 224 may be received 602 on a physical uplink control channel (PUCCH) 212b. In yet another configuration, the multi-hypothesis channel quality indicator (MH-CQI) values 224 may be received 602 on a combination of the physical uplink shared channel (PUSCH) 212a and the physical uplink control channel (PUCCH) 212b.

The base station 104 may use 604 the multi-hypothesis channel quality indicator (MH-CQI) values 224 for improved scheduling. In one configuration, the base station 104 may use 604 the multi-hypothesis channel quality indicator (MH-CQI) values 224 for improved single-cell multi-user multiple-input and multiple-output (MU-MIMO) scheduling, including wireless communication device 102 pairing and rate prediction. For example, in a multi-user multiple-input and multiple-output (MU-MIMO) transmission, a base station 104 may use 604 the multi-hypothesis channel quality indicator (MH-CQI) values 224 in a unified feedback framework.

With multi-user multiple-input and multiple-output (MU-MIMO), the task of pairing wireless communication devices 102 at the base station 104 is greatly facilitated by receiving multi-user multiple-input and multiple-output (MU-MIMO) specific reports and can be well integrated into existing multi-user multiple-input and multiple-output (MU-MIMO) procedures. Specifically, based on the multi-hypothesis channel quality indicator (MH-CQI) values 224 received 602 from one or more wireless communication devices 102, the base station 104 may first attempt to find good matches based on the different hypotheses expressed in the multi-hypothesis channel quality indicator (MH-CQI) values 224.

It is important to note that finding such pairs is not necessarily restricted to the set of wireless communication devices 102 that sent multi-user multiple-input and multiple-output (MU-MIMO) specific reports. Instead, since the preferred precoder indication is based on rank-2 precoding matrix indicator (PMI) reports, such pairing can equivalently also be supported between wireless communication devices 102 that have reported rank-2 and multi-user multiple-input and multiple-output (MU-MIMO), respectively. In fact, the base station 104 may look among wireless communication devices 102 for precoders that perfectly align, meaning that the layer based on which one wireless communication device 102 gets served is the preferred pairing of the other wireless communication device 102 and vice versa. In case such a pairing is indeed scheduled, the multi-hypothesis channel quality indicator (MH-CQI) values 224 computed by the wireless communication devices 102 are actually accurate and need no further adjustment, thereby improving the important task of rate prediction at the base station 104.

The above scheduling relies on being able to find a wireless communication device 102 pair with matching precoding matrix indicators (PMIs). How frequently such a scenario occurs depends on the number of wireless communication devices 102 per cell as well as channel conditions. In case such a scenario does not occur frequently enough, the base station 104 may also consider partial precoding matrix indicator (PMI) matches for the wireless communication device 102 pairing. For example, if a first wireless communication device 102 sent multi-hypothesis channel quality indicator (MH-CQI) values 224 based on a rank-1 report while a second wireless communication device 102 sent multi-hypothesis channel quality indicator (MH-CQI) values 224 based on a multi-user multiple-input and multiple-output (MU-MIMO) or rank-2 report, a partial pairing can still take place if the rank-1 precoder of the first wireless communication device 102 lines up with the precoder pairing of the rank-2 or multi-user multiple-input and multiple-output (MU-MIMO) report of the second wireless device 102. In this case, only one of the multi-hypothesis channel quality indicator (MH-CQI) values 224 of the wireless communication devices 102 reflects the multi-user multiple-input and multiple-output (MU-MIMO) hypothesis, but some performance gain can still be expected in this case.

The above pairing procedure should not be viewed as a replacement for the conventional multi-user multiple-input and multiple-output (MU-MIMO) procedure. Instead, both techniques may complement each other and may be executed in parallel. Specifically, the channel quality indicator (CQI) scheduling module 508 may possess sufficient information to weigh one technique versus the other.

The base station 104 may also use 604 the multi-hypothesis channel quality indicator (MH-CQI) values 224 for improved scheduling within a coordinated multipoint (CoMP) cluster. This may be implemented as described below in connection with FIG. 7.

Figure 7:
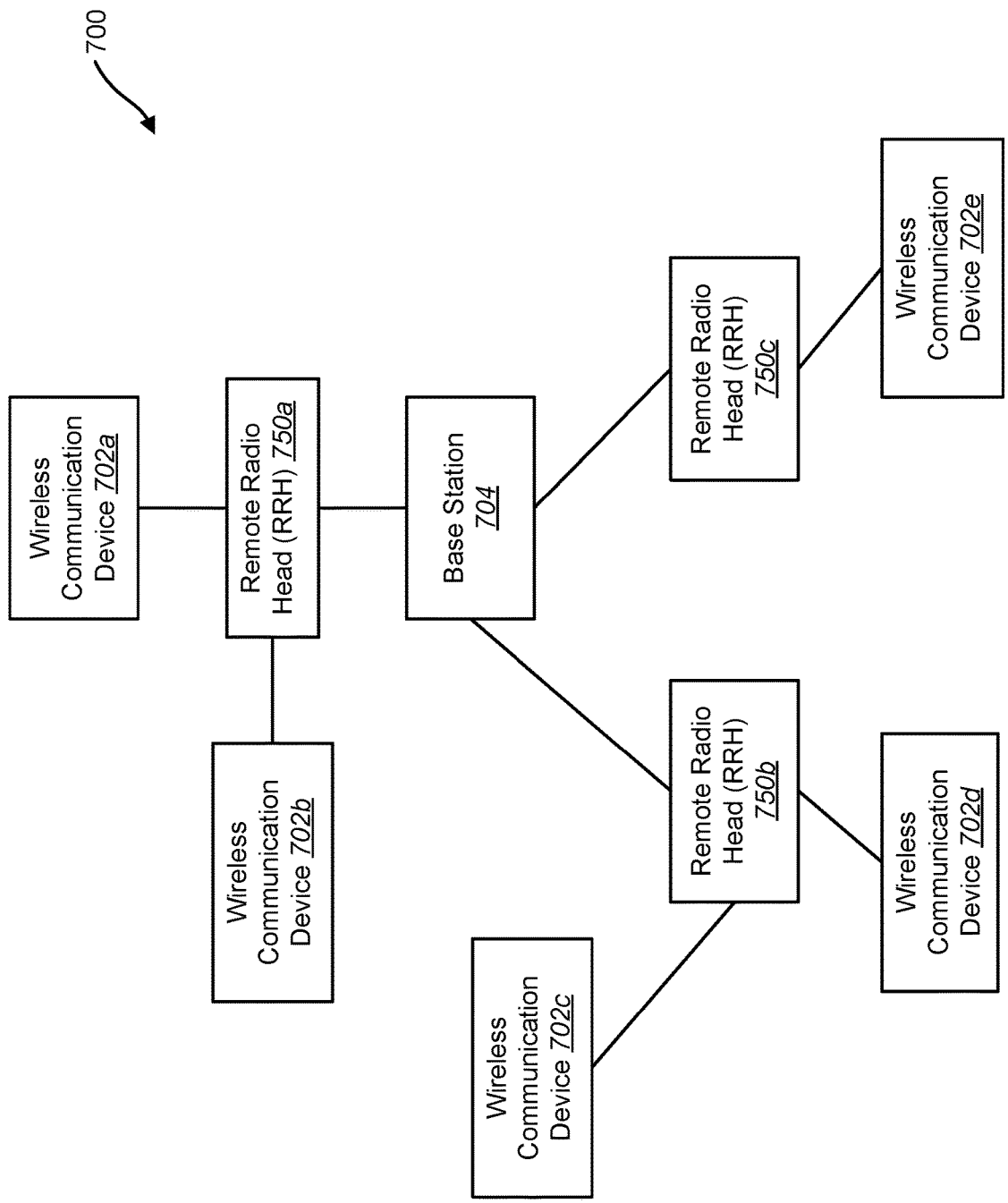
FIG. 7 is a block diagram illustrating one example of a coordinated multipoint (CoMP) cluster operating in accordance with the systems and methods disclosed herein.

FIG. 7 is a block diagram illustrating one example of a coordinated multipoint (CoMP) cluster 700 operating in accordance with the systems and methods disclosed herein. A coordinated multipoint (CoMP) cluster 700 may include one macro cell (e.g., a base station 704) and one or more remote radio heads (RRHs) 750a-c. A macro-remote radio head (RRH) 750 deployment is an architecture where baseband components in a base station 704 are digitally connected to a group of radio frequency (RF) components (mounted on top of antenna towers, for example). The use of remote radio heads (RRHs) 750a-c may reduce the radio frequency (RF) power requirements from a power amplifier in the base station 704 while improving signal transfer. Each remote radio head (RRH) 750 may be coupled to a base station 704 via a wired (e.g., fiber optic cable) or wireless link.

Multiple wireless communication devices 702a-e may be associated with a remote radio head (RRH) 750. Within the coordinated multipoint (CoMP) cluster 700, each of the remote radio heads (RRHs) 750a-c may be associated with one base station 704 (which may be referred to as a macro eNB). It may be assumed that the base station 704 is fiber-connected with multiple remote radio heads (RRHs) 750a-c, where the backhaul is ideal. Even though in a sectorized deployment a single base station 704 may control multiple sectors, no scheduling coordination among sectors belonging to the same base station 704 is assumed. Furthermore, no scheduling coordination among different base stations 704 is assumed.

Because each coordinated multipoint (CoMP) cluster 700 makes scheduling decisions independently of neighbors (e.g., other coordinated multipoint (CoMP) clusters 700), only a single coordinated multipoint (CoMP) cluster 700 is discussed. It may be assumed that all wireless communication devices 702 are advanced wireless communication devices 702 featuring the multi-hypothesis channel quality indicator (MH-CQI) feedback discussed above. However, supporting legacy wireless communication devices 702 may be a straightforward extension of the disclosed systems and methods.

All wireless communication devices 702 associated with a remote radio head (RRH) 750 may be instructed by the network (e.g., by the base station 704) to periodically feedback multi-hypothesis channel quality indicator (MH-CQI) values 224. For the sake of the multi-hypothesis channel quality indicator (MH-CQI) feedback, the dominant interferer may be assumed to be the base station 704 that the remote radio head (RRH) 750 is fiber-connected to. In practice, it may be challenging for those wireless communication devices 702 where the signal from the base station 704 is very weak (e.g., much weaker than the signal from the serving remote radio head (RRH) 750). These wireless communication devices 702 may not be able to acquire synchronization to the base station 704. Depending on the practical implementation of the multi-hypothesis channel quality indicator (MH-CQI) estimation (described below in connection with FIG. 8), these wireless communication devices 702 may not be able to compute a multi-hypothesis channel quality indicator (MH-CQI) value 224. However, wireless communication devices 702 in such conditions are not significantly affected by interference coming from the base station 704. Thus, there may be less need for multi-hypothesis channel quality indicator (MH-CQI) feedback for these wireless communication devices 702.

Figure 8:
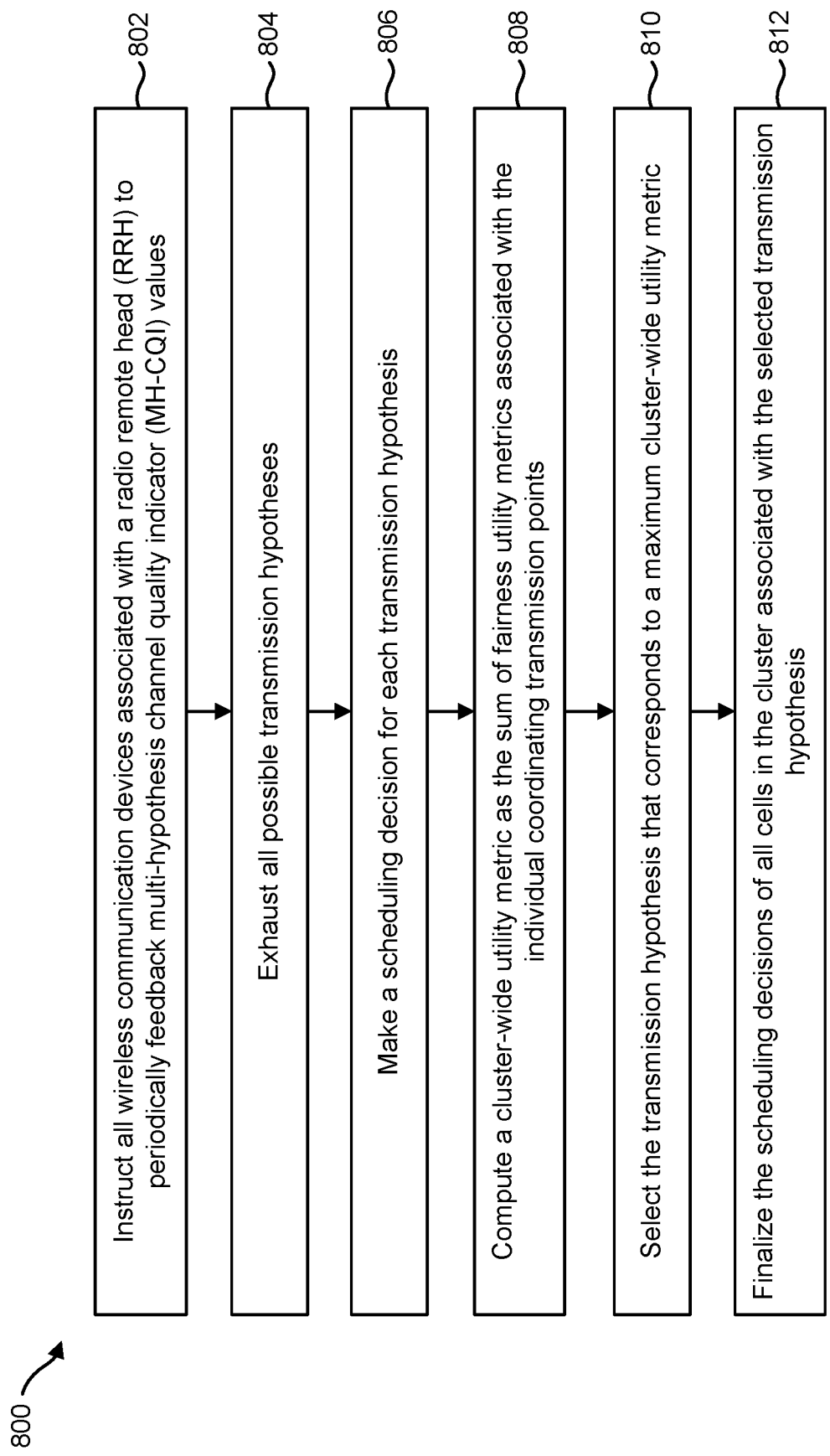
FIG. 8 is a flow diagram of a method for cluster-wide joint scheduling.

FIG. 8 is a flow diagram of a method 800 for cluster-wide joint scheduling. The method 800 may be performed by a base station 704. The base station 704 may instruct 802 all wireless communication devices 702 associated with a remote radio head (RRH) 750 to periodically feedback multi-hypothesis channel quality indicator (MH-CQI) values 224. The method 800 may be applied to subframes where the macro (e.g., base station 704) is allowed to transmit on the physical downlink shared channel (PDSCH) (e.g., non-almost blank subframes (ABS) subframes). For almost blank subframes (ABS), a base scheduler, which takes independent scheduling decisions for each cell in the coordinated multipoint (CoMP) cluster 700, may be adopted.

The base station 704 may exhaust 804 all possible transmission hypotheses. The transmission hypotheses may be based on the multi-hypothesis channel quality indicator (MH-CQI) values 224 received from the wireless communication devices 702. The multi-hypothesis channel quality indicator (MH-CQI) feedback may include a limited set of hypotheses. For example, each hypothesis included in the multi-hypothesis channel quality indicator (MH-CQI) feedback has feedback overhead, so it may be desirable to limit this feedback overhead as much as possible.

The base station 704 may exhaust 804 all possible transmission hypotheses received from the wireless communication devices 702, as there is only computation cost associated with considering all potential hypotheses. In some configurations, exhausting 804 all possible transmission hypotheses may include receiving and ordering the multi-hypothesis channel quality indicator (MH-CQI) feedback from the wireless communication devices 702. Because the wireless communication devices 702 may provide feedback under different sets of hypotheses, it may be necessary to exhaust 804 all transmission hypotheses at the network side.

The transmission hypotheses may include muting (e.g., no macro transmission on the considered scheduling resource) and/or codebook-based precoded transmissions for all transmission beams belonging to the codebook. Scheduling resources may refer to a set of consecutive physical resource blocks (PRBs) of a single subframe. The scheduling granularity may be chosen based on the number of active traffic flows, the corresponding delay constraints, the control channel capacity, and/or the configured channel quality indicator (CQI) feedback parameters (e.g., wideband encoding).

The base station 704 may make 806 a scheduling decision for each transmission hypothesis. The scheduling decision may be the optimal scheduling decision. For example, if the transmission hypothesis concerns a transmission with a specific number of layers and beams, only the wireless communication devices 702 that fed back a precoding matrix indicator (PMI) and a rank indicator (RI) compatible with the transmission are accounted for. In one configuration, among the compatible wireless communication devices 702, selection may be made according to a proportional fairness (PF) criterion. The proportional fairness (PF) criterion is a specific criterion for balancing priority among wireless communication devices 702 with different long-term channel conditions. The base station 704 may make an optimal scheduling decision for each remote radio head (RRH) 750, assuming the hypothesized macro transmission. Making an optimal scheduling decision for each remote radio head (RRH) 750 is discussed in additional detail below in relation to FIG. 9.

The base station 704 may compute 808 a cluster-wide utility metric as the sum of fairness utility metrics associated with the individual coordinating transmission points. In one configuration, these fairness utility metrics may be single-cell proportional fairness (PF) utility metrics of each of the involved nodes (e.g., the remote radio heads 750). The individual coordinating transmission points may include the remote radio heads 750. The macro proportional fairness (PF) utility metric associated with the macro muting hypothesis may be zero.

The base station 704 may select 810 the transmission hypothesis that corresponds to a maximum cluster-wide utility metric. The maximum cluster-wide utility metric may be based on the channel state information (CSI) of wireless communication devices 702 associated with different cells. The channel state information (CSI) may be based on the multi-hypothesis channel quality indicator (MH-CQI) values 224 provided by the wireless communication devices 702. Therefore, the selected 810 transmission hypothesis is a maximized utility metric that is based on fairness constraints.

The base station 704 may finalize 812 the scheduling decisions of all cells in the coordinated multipoint (CoMP) cluster 700 associated with the selected transmission hypothesis. Rate prediction, for the sake of modulation and coding scheme (MCS) selection for the selected wireless communication devices 702, may be based on the channel quality indicator (CQI) associated with the selected macro hypothesis. The macro hypothesis corresponds to the precoder (including the possibility of muting) selected at the macro transmission point. As the base station 704 may be the dominant interferer for all wireless communication devices 702 (as illustrated in FIG. 7, for example), the base station 704 may be selected as the macro hypothesis to maximize the cluster-wide utility metric. In one configuration, low power node scheduling decisions may be based on the selected 810 transmission hypothesis.

Besides the potential beamforming gain, the method 800 may also include a rate prediction gain for the wireless communication devices 702. Due to the multi-hypothesis channel quality indicator (MH-CQI) feedback, the scheduler may know the specific channel quality experienced by a wireless communication device 702 when the selected macro transmission is employed, thus allowing a rate prediction matched to the actual macro transmission strategy.

It may be assumed that retransmissions are prioritized. Thus, retransmissions may also preempt new transmissions. If a remote radio head (RRH) 750 has a pending retransmission, such as a packet transmitted in eight (using frequency division duplex (FDD)) subframes that was not decoded correctly, the retransmission may be picked as a final scheduling decision, regardless of the macro hypothesis and the other wireless communication devices 702 with pending new transmissions in the remote radio head (RRH) 750. Additional wireless communication devices 702 may be considered for the resources not already taken by the scheduled retransmissions. If the base station 704 has a pending retransmission on a given resource, the only transmission hypothesis compatible with the considered retransmission may be selected, and no optimization may be performed for the hypotheses.

Because in sectorized deployments a single base station 704 may control multiple sectors, a natural extension of the remote radio head (RRH)-CoMP scheme may be used to increase the coordinated multipoint (CoMP) cluster 700 size. Thus, the coordinated multipoint (CoMP) cluster 700 may be defined as the set of all macro sectors belonging to the same base station 704 plus all the remote radio heads (RRHs) 750 that are fiber connected to the base station 704. A single centralized scheduling algorithm may be defined for the whole coordinated multipoint (CoMP) cluster 700, thus implicitly introducing inter-sector coordination. This may lead to further performance enhancements (especially for those wireless communication devices 702 suffering from significant inter-sector interference (e.g., wireless communication devices 702 that may experience significant interference spilling from a macro sector different from the macro sector with which the wireless communication devices 702 are associated)).

The multi-hypothesis channel quality indicator (MH-CQI) feedback scheme described herein may be enhanced to effectively see any inter-sector coordination, taking into account the practical uplink overhead limitations. In particular, each wireless communication devices 702 may determine (or alternatively, may be instructed by the network to determine) a first dominant macro interferer and a second dominant macro interferer. The dominant macro interferers may be based on the received signal strengths. Both selected macro cells (of the dominant interferers) must belong to the same base station 704 that the remote radio head (RRH) 750 is fiber-connected to. All possible transmission hypotheses of the first dominant interferer may be exhausted, assuming transmission from the second interferer. The multi-hypothesis channel quality indicator (MH-CQI) values 224 may then be computed (by using the systems and methods described herein).

An additional multi-hypothesis channel quality indicator (MH-CQI) value 224 may be added, assuming muting hypotheses for both the first and second interferers. This, in general, will be the highest reported channel quality indicator (CQI), since it assumes no interference from two potentially strong interferers. The scheduler may exhaust combinations of hypotheses for all the sectors belonging to the considered base station 704. In particular, for all hypotheses where two sectors are muted, the additional multi-hypothesis channel quality indicator (MH-CQI) value 224 may be used.

Figure 9:
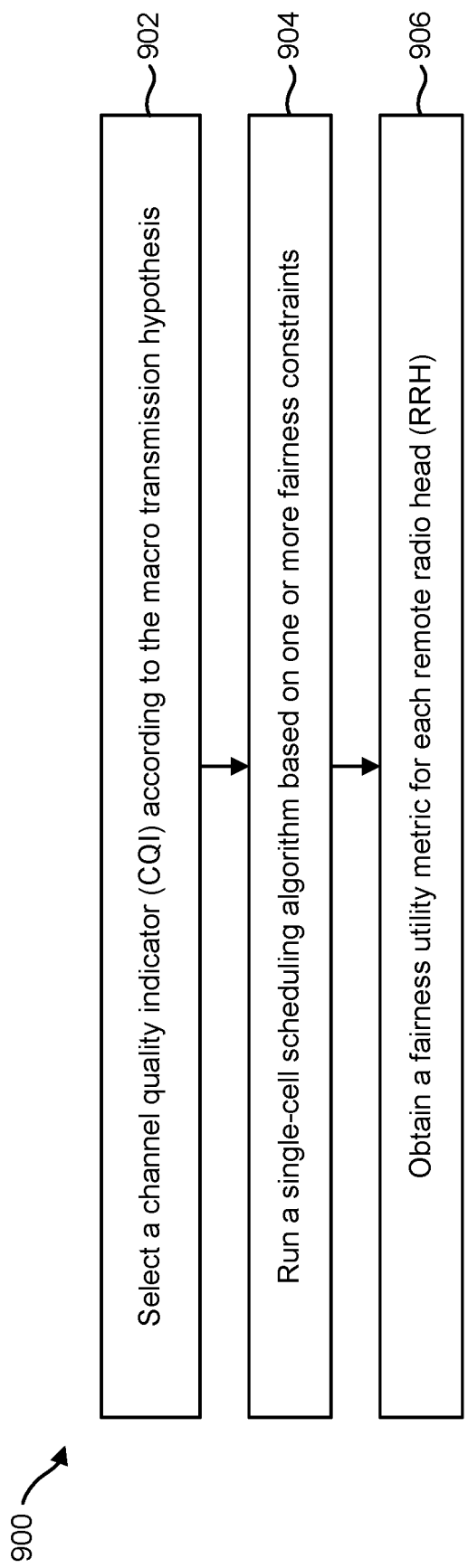
FIG. 9 is a flow diagram of a method for making an optimal scheduling decision for each remote radio head (RRH)

FIG. 9 is a flow diagram of a method 900 for making an optimal scheduling decision for each remote radio head (RRH) 750. Making a scheduling decision for each transmission hypothesis was discussed above in relation to FIG. 8. This may include making an optimal scheduling decision for each remote radio head (RRH) 750. The method 900 may be performed by a base station 704. The base station 704 may select 902 a channel quality indicator (CQI) according to a macro transmission hypothesis. The channel quality indicator (CQI) may be selected 902 from among the multi-hypothesis channel quality indicator (MH-CQI) fed back by each wireless communication device 702. The selected 902 channel quality indicator (CQI) may be used for rate prediction.

The base station 704 may run 904 a single-cell scheduling algorithm based on one or more fairness constraints. The single-cell scheduling algorithm may be run 904 for each remote radio head (RRH) 750. One fairness constraint may be a proportional fairness (PF) criterion. Other fairness metrics may be included in the single-cell scheduling algorithm. It may be assumed that there is no scheduling coordination among the remote radio heads (RRHs) 750. This mainly stems from the selected multi-hypothesis channel quality indicator (MH-CQI) structure, where the dominant interferer is assumed to be the macro cell and where no additional information about neighbor remote radio head (RRH) 750 transmission hypotheses is considered by the wireless communication device 702 when the multi-hypothesis channel quality indicator (MH-CQI) value 224 is computed.

The base station 704 may obtain 906 a fairness utility metric for each remote radio head (RRH) 750. The fairness utility metrics may be based on the result of the single-cell scheduling algorithm run for each remote radio head (RRH)

750. In one configuration, the fairness utility metric may be a single-cell proportional fairness (PF) utility metric based on a proportional fairness (PF) criterion. The fairness utility metric may also be based on other fairness metrics.

Figure 10:
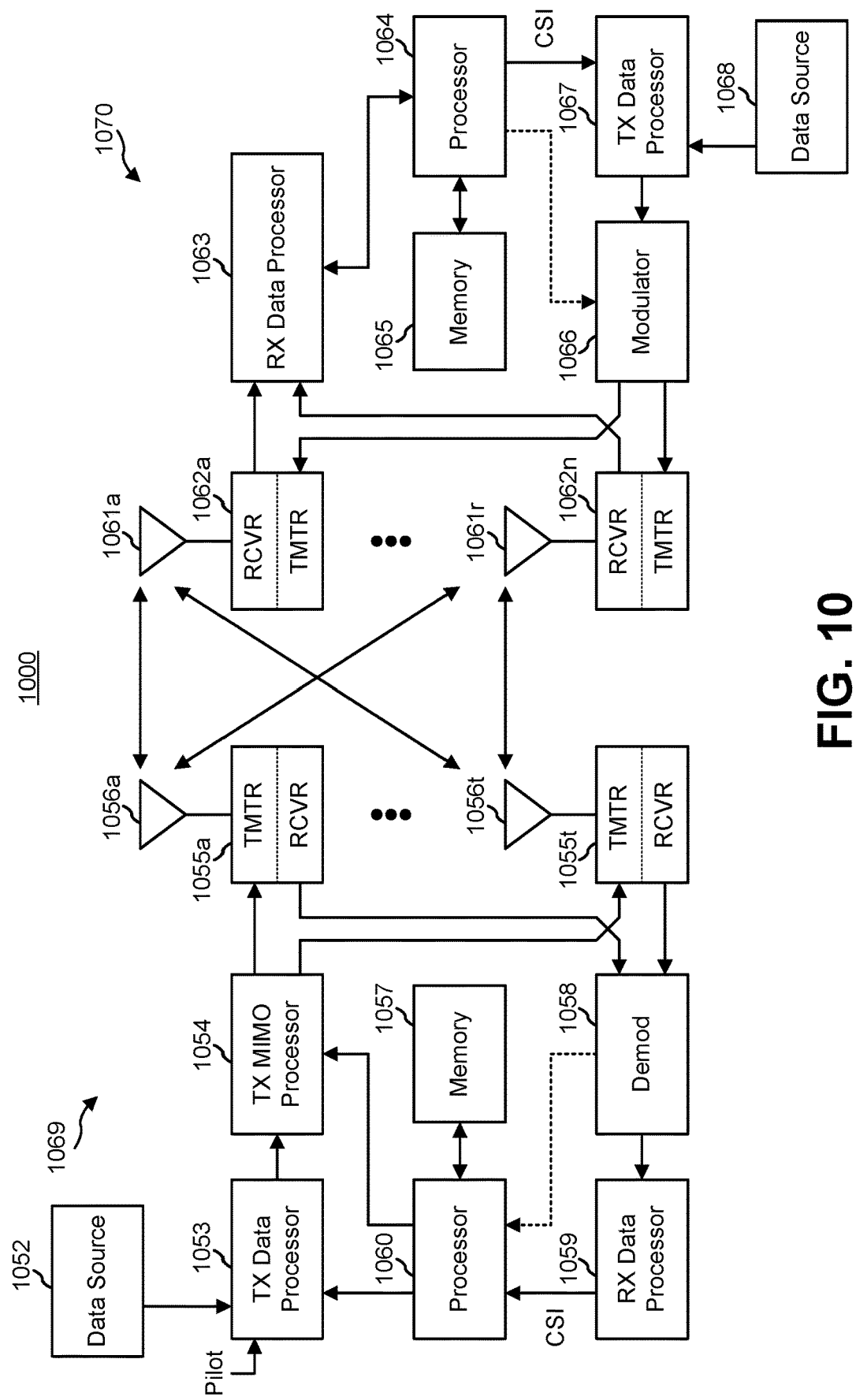
FIG. 10 is a block diagram of a transmitter and receiver in a multiple-input and multiple-output (MIMO) system.

FIG. 10 is a block diagram of a transmitter 1069 and receiver 1070 in a multiple-input and multiple-output (MIMO) system 1000. In the transmitter 1069, traffic data for a number of data streams is provided from a data source 1052 to a transmit (TX) data processor 1053. Each data stream may then be transmitted over a respective transmit antenna 1056a through 1056t. The transmit (TX) data processor 1053 may format, code, and interleave the traffic data for each data stream based on a particular coding scheme selected for that data stream to provide coded data.

The coded data for each data stream may be multiplexed with pilot data using OFDM techniques. The pilot data may be a known data pattern that is processed in a known manner and used at the receiver 1070 to estimate the channel response. The multiplexed pilot and coded data for each stream is then modulated (i.e., symbol mapped) based on a particular modulation scheme (e.g., binary phase shift keying (BPSK), quadrature phase shift keying (QPSK), multiple phase shift keying (M-PSK) or multi-level quadrature amplitude modulation (M-QAM)) selected for that data stream to provide modulation symbols. The data rate, coding and modulation for each data stream may be determined by instructions performed by a processor.

The modulation symbols for all data streams may be provided to a transmit (TX) multiple-input and multiple-output (MIMO) processor 1054, which may further process the modulation symbols (e.g., for OFDM). The transmit (TX) multiple-input and multiple-output (MIMO) processor 1054 then provides NT modulation symbol streams to NT transmitters (TMTR) 1055a through 1055t. The TX transmit (TX) multiple-input and multiple-output (MIMO) processor 1054 may apply beamforming weights to the symbols of the data streams and to the antenna 1056 from which the symbol is being transmitted.

Each transmitter 1055 may receive and process a respective symbol stream to provide one or more analog signals, and further condition (e.g., amplify, filter and upconvert) the analog signals to provide a modulated signal suitable for transmission over the MIMO channel. NT modulated signals from transmitters 1055a through 1055t are then transmitted from NT antennas 1056a through 1056t, respectively.

At the receiver 1070, the transmitted modulated signals are received by NR antennas 1061a through 1061r and the received signal from each antenna 1061 is provided to a respective receiver (RCVR) 1062a through 1062n. Each receiver 1062 may condition (e.g., filter, amplify and downconvert) a respective received signal, digitize the conditioned signal to provide samples, and further process the samples to provide a corresponding "received" symbol stream.

An RX data processor 1063 then receives and processes the NR received symbol streams from NR receivers 1062 based on a particular receiver processing technique to provide NT "detected" symbol streams. The RX data processor 1063 then demodulates, deinterleaves and decodes each detected symbol stream to recover the traffic data for the data stream. The processing by RX data processor 1063 is complementary to that performed by TX MIMO processor 1054 and TX data processor 1053 at transmitter system 1069.

A processor 1064 may periodically determine which pre-coding matrix to use. The processor 1064 may store information on and retrieve information from memory 1065.

The processor 1064 formulates a reverse link message comprising a matrix index portion and a rank value portion. The reverse link message may be referred to as channel state information (CSI). The reverse link message may comprise various types of information regarding the communication link and/or the received data stream. The reverse link message is then processed by a TX data processor 1067, which also receives traffic data for a number of data streams from a data source 1068, modulated by a modulator 1066, conditioned by transmitters 1062a through 1062n, and transmitted back to the transmitter 1069.

At the transmitter 1069, the modulated signals from the receiver are received by antennas 1056, conditioned by receivers 1055, demodulated by a demodulator 1058, and processed by an RX data processor 1059 to extract the reverse link message transmitted by the receiver system 1070. A processor 1060 may receive channel state information (CSI) from the RX data processor 1059. The processor 1060 may store information on and retrieve information from memory 1057. The processor 1060 then determines which pre-coding matrix to use for determining the beamforming weights and then processes the extracted message.

Figure 11:
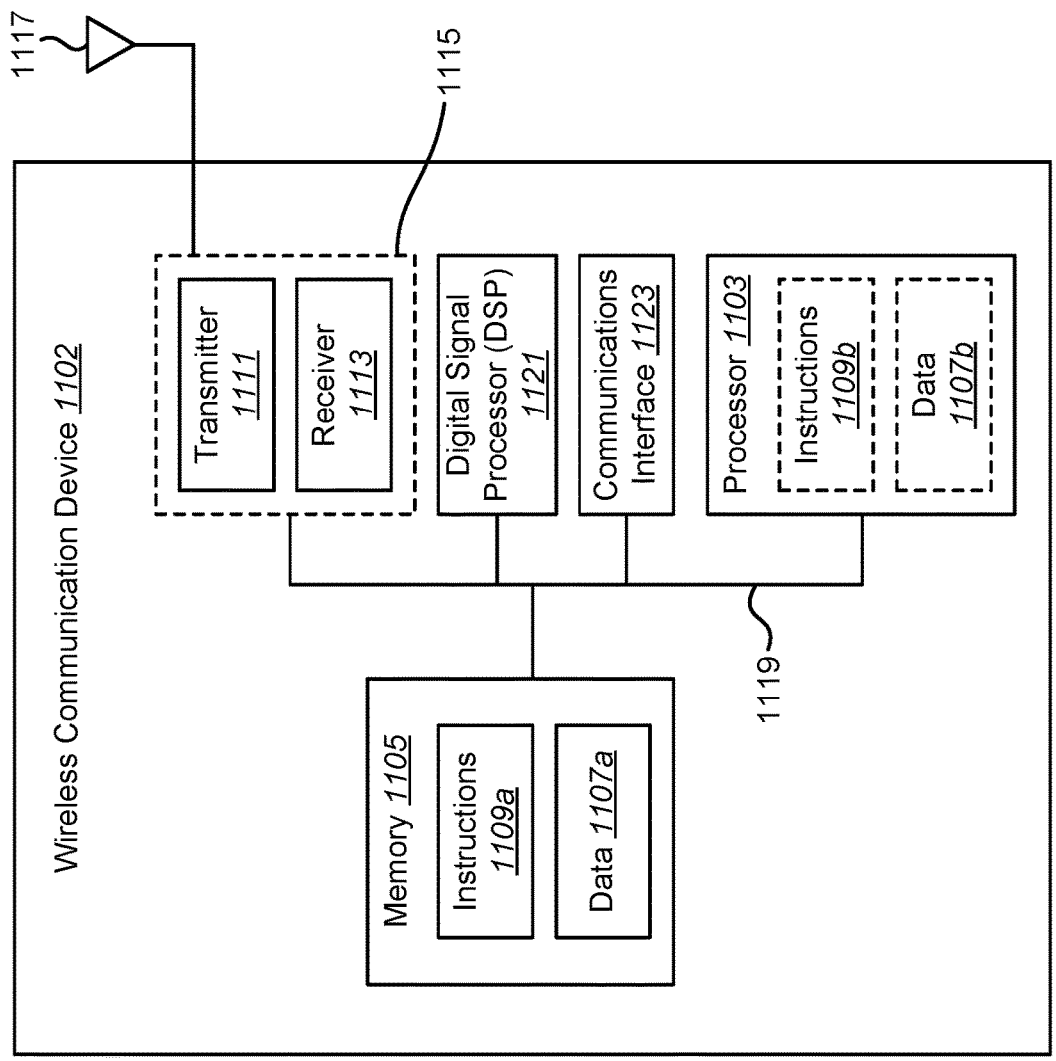
FIG. 11 illustrates certain components that may be included within a wireless communication device.

FIG. 11 illustrates certain components that may be included within a wireless communication device 1102. The wireless communication device 1102 may be an access terminal, a mobile station, a user equipment (UE), etc. The wireless communication device 1102 includes a processor 1103. The processor 1103 may be a general purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although just a single processor 1103 is shown in the wireless communication device 1102 of FIG. 11, in an alternative configuration, a combination of processors (e.g., an ARM and DSP) could be used.

The wireless communication device 1102 also includes memory 1105. The memory 1105 may be any electronic component capable of storing electronic information. The memory 1105 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1107a and instructions 1109a may be stored in the memory 1105. The instructions 1109a may be executable by the processor 1103 to implement the methods disclosed herein. Executing the instructions 1109a may involve the use of the data 1107a that is stored in the memory 1105. When the processor 1103 executes the instructions 1109a, various portions of the instructions 1109b may be loaded onto the processor 1103, and various pieces of data 1107b may be loaded onto the processor 1103.

The wireless communication device 1102 may also include a transmitter 1111 and a receiver 1113 to allow transmission and reception of signals to and from the wireless communication device 1102. The transmitter 1111 and receiver 1113 may be collectively referred to as a transceiver 1115. An antenna 1117 may be electrically coupled to the transceiver 1115. The wireless communication device 1102 may also include (not shown) multiple transmitters, multiple receivers, multiple transceivers and/or additional antennas.

The wireless communication device 1102 may include a digital signal processor (DSP) 1121. The wireless communication device 1102 may also include a communications interface 1123. The communications interface 1123 may allow a user to interact with the wireless communication device 1102.

The various components of the wireless communication device 1102 may be coupled together by one or more buses, which may include a power bus, a control signal bus, a status signal bus, a data bus, etc. For the sake of clarity, the various buses are illustrated in FIG. 11 as a bus system 1119.

Figure 12:
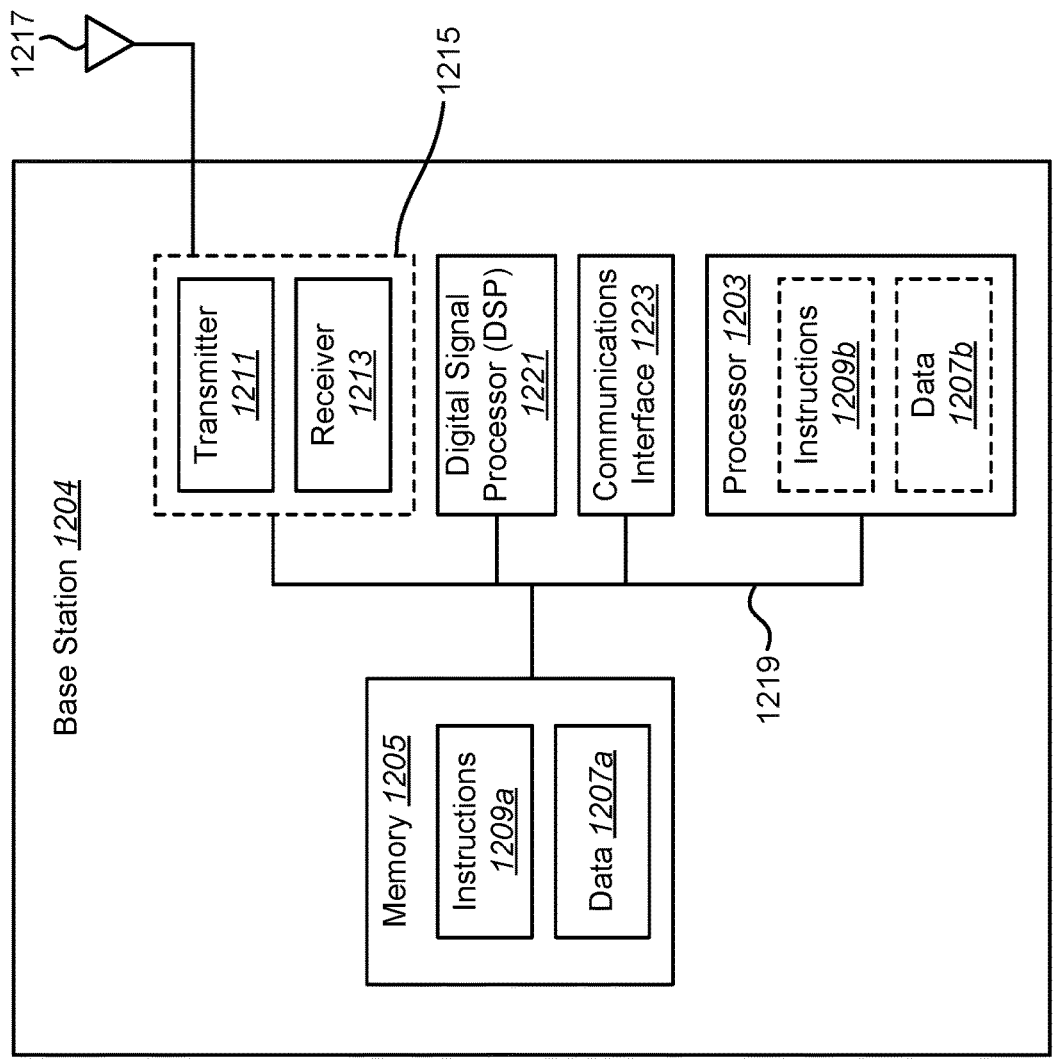
FIG. 12 illustrates certain components that may be included within a base station.

FIG. 12 illustrates certain components that may be included within a base station 1204. A base station 1204 may also be referred to as, and may include some or all of the functionality of, an access point, a broadcast transmitter, a NodeB, an evolved NodeB, etc. The base station 1204 includes a processor 1203. The processor 1203 may be a general purpose single- or multi-chip microprocessor (e.g., an ARM), a special purpose microprocessor (e.g., a digital signal processor (DSP)), a microcontroller, a programmable gate array, etc. The processor 1203 may be referred to as a central processing unit (CPU). Although just a single processor 1203 is shown in the base station 1204 of FIG. 12, in an alternative configuration, a combination of processors (e.g., an ARM and DSP) could be used.

The base station 1204 also includes memory 1205. The memory 1205 may be any electronic component capable of storing electronic information. The memory 1205 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Data 1207a and instructions 1209a may be stored in the memory 1205. The instructions 1209a may be executable by the processor 1203 to implement the methods disclosed herein. Executing the instructions 1209a may involve the use of the data 1207a that is stored in the memory 1205. When the processor 1203 executes the instructions 1209a, various portions of the instructions 1209b may be loaded onto the processor 1203, and various pieces of data 1207b may be loaded onto the processor 1203.

The base station 1204 may also include a transmitter 1211 and a receiver 1213 to allow transmission and reception of signals to and from the base station 1204. The transmitter 1211 and receiver 1213 may be collectively referred to as a transceiver 1215. An antenna 1217 may be electrically coupled to the transceiver 1215. The base station 1204 may also include (not shown) multiple transmitters, multiple receivers, multiple transceivers and/or additional antennas.

The base station 1204 may include a digital signal processor (DSP) 1221. The base station 1204 may also include a communications interface 1223. The communications interface 1223 may allow a user to interact with the base station 1204.

The various components of the base station 1204 may be coupled together by one or more buses, which may include a power bus, a control signal bus, a status signal bus, a data bus, etc. For the sake of clarity, the various buses are illustrated in FIG. 12 as a bus system 1219.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 4, 6, 8 and 9, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for receiving multi-hypothesis channel quality indicator feedback, comprising:
sending semi-static and dynamic signaling;
receiving an uplink symbol that comprises a channel quality indicator and multi-hypothesis channel quality indicator values, wherein the multi-hypothesis channel quality indicator values correspond to multiple hypotheses that are based on both the semi-static and dynamic signaling; and
using the multi-hypothesis channel quality indicator values for channel scheduling.

2. The method of claim 1, wherein the method is performed by a base station.

3. The method of claim 1, wherein the multi-hypothesis channel quality indicator values are received from a wireless communication device.

4. The method of claim 1, wherein the scheduling comprises single-cell multi-user multiple-input and multiple-output scheduling, and wherein the single-cell multi-user multiple-input and multiple-output scheduling comprises at least one of wireless communication device pairing and rate prediction.

5. The method of claim 1, wherein the scheduling comprises scheduling within a coordinated multipoint cluster.

6. The method of claim 1, further comprising sending a signal to a wireless communication device indicating whether to compute and report multi-hypothesis channel quality indicator values, wherein the signal comprises a coordinated precoding type indicator.

7. The method of claim 6, wherein the coordinated precoding type indicator signals a type of interference situation.

8. The method of claim 1, further comprising signaling a dominant interferer, wherein the signaling comprises a combination of the semi-static and dynamic signaling.

9. The method of claim 1, further comprising signaling a set of hypotheses to generate the multi-hypothesis channel quality indicator values, wherein the set of hypotheses is signaled by a combination of the semi-static and dynamic signaling.

10. The method of claim 1, further comprising:
instructing all wireless communication devices associated with a remote radio head to periodically feedback multi-hypothesis channel quality indicator values;
exhausting all received transmission hypotheses;
making a scheduling decision for each transmission hypothesis;
computing a cluster-wide utility metric as a sum of fairness utility metrics associated with individual coordinating transmission points, wherein each fairness utility metric indicates a scheduling priority corresponding to a coordinating transmission point in a cluster of the coordinating transmission points;
selecting the transmission hypothesis that corresponds to a maximum cluster-wide utility metric; and
finalizing the scheduling decisions of all cells in the cluster associated with the selected transmission hypothesis.

11. The method of claim 10, wherein making a scheduling decision for each transmission hypothesis comprises:
selecting a second channel quality indicator from among the multi-hypothesis channel quality indicator values;
running a single-cell scheduling algorithm based on one or more fairness constraints; and
obtaining a fairness utility metric for each remote radio head.

12. The method of claim 10, wherein the maximum cluster-wide utility metric is based on channel state information of wireless communication devices associated with different cells.

13. The method of claim 12, wherein the channel state information is based on the multi-hypothesis channel quality indicator values, and wherein the wireless communication devices used the multiple hypotheses to compute the multi-hypothesis channel quality indicator values.

14. The method of claim 10, wherein muting and codebook-based precoded transmissions are used for all beams in a codebook.

15. The method of claim 10, wherein wireless communication devices compatible with the selected transmission hypothesis are scheduled.

16. The method of claim 10, wherein low power node scheduling decisions are based on the selected transmission hypothesis.

17. The method of claim 10, wherein a pending retransmission uses the selected transmission hypothesis without optimization.

18. An apparatus for receiving multi-hypothesis channel quality indicator feedback, comprising:

a processor;
memory in electronic communication with the processor; and
instructions stored in the memory, the instructions being executable by the processor to:
send semi-static and dynamic signaling;
receive an uplink symbol that comprises a channel quality indicator and multi-hypothesis channel quality indicator values, wherein the multi-hypothesis channel quality indicator values correspond to multiple hypotheses that are based on both the semi-static and dynamic signaling; and
use the multi-hypothesis channel quality indicator values for channel scheduling.

19. The apparatus of claim 18, wherein the scheduling comprises single-cell multi-user multiple-input and multiple-output scheduling, and wherein the single-cell multi-user multiple-input and multiple-output scheduling comprises at least one of wireless communication device pairing and rate prediction.

20. The apparatus of claim 18, wherein the scheduling comprises scheduling within a coordinated multipoint cluster.

21. The apparatus of claim 18, further comprising instructions executable to send a signal to a wireless communication device indicating whether to compute and report multi-hypothesis channel quality indicator values, wherein the signal comprises a coordinated precoding type indicator.

22. The apparatus of claim 18, further comprising instructions executable to signal a dominant interferer, wherein the signaling comprises a combination of the semi-static and dynamic signaling.

23. The apparatus of claim 18, further comprising instructions executable to signal a set of hypotheses to generate the multi-hypothesis channel quality indicator values, wherein the set of hypotheses is signaled by a combination of the semi-static and dynamic signaling.

24. The apparatus of claim 18, wherein the instructions are further executable to:
instruct all wireless communication devices associated with a remote radio head to periodically feedback multi-hypothesis channel quality indicator values;
exhaust all received transmission hypotheses;
make a scheduling decision for each transmission hypothesis;
compute a cluster-wide utility metric as a sum of fairness utility metrics associated with individual coordinating transmission points, wherein each fairness utility metric indicates a scheduling priority corresponding to a coordinating transmission point in a cluster of the coordinating transmission points;
select the hypothesis that corresponds to a maximum cluster-wide utility metric; and
finalize the scheduling decisions of all cells in the cluster associated with the selected hypothesis.

25. The apparatus of claim 24, wherein the instructions executable to make a scheduling decision for each transmission hypothesis are further executable to:
select a second channel quality indicator from among the multi-hypothesis channel quality indicator values;
run a single-cell scheduling algorithm based on one or more fairness constraints for each remote radio head; and
obtain a fairness utility metric for each remote radio head.

26. A wireless device comprising:
means for sending semi-static and dynamic signaling;
means for receiving an uplink symbol that comprises a channel quality indicator and multi-hypothesis channel quality indicator values, wherein the multi-hypothesis channel quality indicator values correspond to multiple hypotheses that are based on both the semi-static and dynamic signaling; and
means for using the multi-hypothesis channel quality indicator values for channel scheduling.

27. The wireless device of claim 26, further comprising:
means for instructing all wireless communication devices associated with a remote radio head to periodically feedback multi-hypothesis channel quality indicator values;
means for exhausting all received transmission hypotheses;
means for making a scheduling decision for each transmission hypothesis;
means for computing a cluster-wide utility metric as a sum of fairness utility metrics associated with individual coordinating transmission points, wherein each fairness utility metric indicates a scheduling priority corresponding to a coordinating transmission point in a cluster of the coordinating transmission points;
means for selecting the hypothesis that corresponds to a maximum cluster-wide utility metric; and
means for finalizing the scheduling decisions of all cells in the cluster associated with the selected hypothesis.

28. A computer-program product for receiving multi-hypothesis channel quality indicator feedback, the computer-program product comprising a non-transitory computer-readable medium having instructions thereon, the instructions comprising:
code for causing a base station to send semi-static and dynamic signaling;
code for causing the base station to receive an uplink symbol that comprises a channel quality indicator and multi-hypothesis channel quality indicator values, wherein the multi-hypothesis channel quality indicator values correspond to multiple hypotheses that are based on both the semi-static and dynamic signaling; and
code for causing the base station to use the multi-hypothesis channel quality indicator values for channel scheduling.

29. The computer-program product of claim 28, further comprising:
code for causing the base station to instruct all wireless communication devices associated with a remote radio head to periodically feedback multi-hypothesis channel quality indicator values;
code for causing the base station to exhaust all received transmission hypotheses;
code for causing the base station to make a scheduling decision for each transmission hypothesis;
code for causing the base station to compute a cluster-wide utility metric as a sum of fairness utility metrics associated with individual coordinating transmission points, wherein each fairness utility metric indicates a scheduling priority corresponding to a coordinating transmission point in a cluster of the coordinating transmission points;
code for causing the base station to select the hypothesis that corresponds to a maximum cluster-wide utility metric; and
code for causing the base station to finalize the scheduling decisions of all cells in the cluster associated with the selected hypothesis.

* * * * *